(12) United States Patent
VanDaalwyk et al.

(10) Patent No.: US 12,263,615 B2
(45) Date of Patent: Apr. 1, 2025

(54) CIRCULAR SAW

(71) Applicant: MILWAUKEE ELECTRIC TOOL CORPORATION, Brookfield, WI (US)

(72) Inventors: Brett J. VanDaalwyk, Milwaukee, WI (US); Daryl S. Richards, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/532,261

(22) Filed: Nov. 22, 2021

(65) Prior Publication Data

US 2022/0161455 A1 May 26, 2022

Related U.S. Application Data

(60) Provisional application No. 63/117,119, filed on Nov. 23, 2020.

(51) Int. Cl.
*B27G 19/04* (2006.01)
*B23D 47/02* (2006.01)
(Continued)

(52) U.S. Cl.
CPC ............ *B27G 19/04* (2013.01); *B23D 47/02* (2013.01); *B23D 47/12* (2013.01); *B23D 59/007* (2013.01); *B23D 45/006* (2013.01)

(58) Field of Classification Search
CPC ...... B27G 19/04; B23D 47/12; B23D 59/007; B27B 9/02; B27B 5/38; B23Q 11/0092
See application file for complete search history.

(56) References Cited

U.S. PATENT DOCUMENTS 1,888,679 A 11/1932 Walter
1,911,045 A 5/1933 Tinnen
(Continued)

FOREIGN PATENT DOCUMENTS

AU 2010101055 A4 11/2010
CN 201067843 Y 6/2008
(Continued)

OTHER PUBLICATIONS

DE20317950U1 (Year: 2013).*
International Search Report and Written Opinion for Application No. PCT/US2021/060304 dated Apr. 22, 2022 (13 pages).

*Primary Examiner* — Jonathan G Riley
(74) *Attorney, Agent, or Firm* — Michael Best & Friedrich LLP

(57) ABSTRACT

A track saw assembly is provided including a track saw (i.e., a circular saw) having a shoe translatable upon a track. Various mechanisms control plunging of a saw unit and saw blade of the track saw relative to the shoe. For example, a plunge lockout mechanism is provided to prevent engagement of a trigger and prevent movement of a plunge mechanism. Various mechanisms control bevel angle adjustment of the saw unit relative to the shoe. For example, a linkage is provided and is operable to shift between a first position and a second position. In the first position, a bevel angle is restricted within a first bevel angle range. In the second position, the bevel angle is restricted within an expanded second bevel angle range. Other concepts relate to the interface between the shoe and the track and a clamp which secures the track to a workpiece.

18 Claims, 21 Drawing Sheets

(51) Int. Cl.
  B23D 47/12 (2006.01)
  B23D 59/00 (2006.01)
  B23D 45/00 (2006.01)

(56) References Cited

U.S. PATENT DOCUMENTS

| | | |
|---|---|---|
| 1,932,511 A | 10/1933 | Clarke |
| 2,346,961 A | 4/1944 | Gundelfinger et al. |
| 2,629,410 A | 2/1953 | Edward |
| 2,677,399 A | 5/1954 | Getsinger |
| 2,818,892 A | 1/1958 | Price |
| 2,819,742 A | 1/1958 | Blachly |
| 2,854,043 A | 9/1958 | Ray |
| 2,911,960 A | 11/1959 | Benz et al. |
| 2,929,419 A | 3/1960 | Johnson |
| 3,011,530 A | 12/1961 | Ellard |
| 3,298,407 A | 1/1967 | Scott |
| 3,450,177 A | 6/1969 | Siegal et al. |
| 3,586,077 A | 6/1971 | Pease |
| 3,623,518 A | 11/1971 | Nicotra |
| 3,645,307 A | 2/1972 | Stocker |
| 3,730,042 A | 5/1973 | Price |
| 3,830,130 A | 8/1974 | Moore |
| 3,991,643 A | 11/1976 | Girardin |
| 4,058,150 A | 11/1977 | Pennington |
| 4,059,038 A | 11/1977 | Rietema |
| 4,078,309 A | 3/1978 | Wilson |
| 4,176,572 A | 12/1979 | Pennington |
| 4,202,233 A | 5/1980 | Larson |
| 4,224,855 A | 9/1980 | Des Roches |
| 4,245,390 A | 1/1981 | Bond |
| 4,307,513 A | 12/1981 | Genge |
| 4,353,165 A | 10/1982 | Albery |
| 4,356,748 A | 11/1982 | Tilton |
| 4,381,103 A | 4/1983 | Ferdinand et al. |
| 4,418,902 A | 12/1983 | Genge |
| 4,450,627 A | 5/1984 | Morimoto |
| 4,453,438 A | 6/1984 | Zelli |
| 4,463,644 A | 8/1984 | Ferdinand et al. |
| 4,539,881 A | 9/1985 | Maier |
| 4,607,555 A | 8/1986 | Erhard |
| 4,619,170 A | 10/1986 | Maier et al. |
| 4,628,608 A | 12/1986 | Kuhlmann et al. |
| 4,677,750 A | 7/1987 | Maier et al. |
| 4,694,720 A | 9/1987 | Brickner, Jr. et al. |
| 4,751,865 A | 6/1988 | Buckalew |
| 4,777,726 A | 10/1988 | Flowers |
| 4,856,394 A | 8/1989 | Clowers |
| 4,919,384 A | 4/1990 | Grimberg |
| 4,999,916 A | 3/1991 | Sistare |
| 5,010,651 A | 4/1991 | Techter et al. |
| 5,062,339 A | 11/1991 | Campos |
| 5,075,976 A | 12/1991 | Young |
| 5,136,910 A | 8/1992 | Kuhn et al. |
| 5,138,759 A | 8/1992 | Gruetzmacher |
| 5,201,863 A | 4/1993 | Peot |
| 5,206,999 A | 5/1993 | Stone |
| 5,235,753 A | 8/1993 | Stumpf |
| 5,239,756 A | 8/1993 | Matzo et al. |
| 5,271,155 A * | 12/1993 | Fuchs .............. B27B 9/02 30/376 |
| 5,287,779 A | 2/1994 | Metzger, Jr. |
| 5,287,780 A | 2/1994 | Metzger, Jr. et al. |
| 5,365,822 A | 11/1994 | Stapleton et al. |
| 5,381,602 A | 1/1995 | Matzo et al. |
| 5,398,456 A | 3/1995 | Kleider |
| 5,427,006 A | 6/1995 | Finley |
| 5,452,515 A | 9/1995 | Schilling |
| 5,454,167 A | 10/1995 | Albery |
| 5,540,129 A | 7/1996 | Kalber et al. |
| 5,561,907 A | 10/1996 | Campbell et al. |
| 5,570,511 A | 11/1996 | Reich et al. |
| 5,669,371 A | 9/1997 | Rupprecht et al. |
| 5,675,898 A | 10/1997 | Kalber et al. |
| 5,676,126 A | 10/1997 | Rupprecht et al. |
| 5,678,314 A | 10/1997 | Braunbach et al. |
| 5,794,351 A | 8/1998 | Campbell et al. |
| 5,815,933 A | 10/1998 | Staniszewski |
| 5,822,864 A | 10/1998 | Campbell et al. |
| 5,911,482 A | 6/1999 | Campbell et al. |
| 6,055,734 A | 5/2000 | McCurry et al. |
| 6,094,827 A | 8/2000 | Campbell |
| 6,108,912 A | 8/2000 | Radigan |
| 6,108,916 A | 8/2000 | Zeiler et al. |
| 6,142,051 A | 11/2000 | Garuglieri |
| 6,202,311 B1 | 3/2001 | Nickels, Jr. |
| 6,237,230 B1 | 5/2001 | Campbell et al. |
| 6,276,064 B1 | 8/2001 | Campbell |
| 6,301,790 B1 | 10/2001 | Zeiler et al. |
| 6,367,790 B2 | 4/2002 | Ocklenburg et al. |
| 6,375,557 B1 | 4/2002 | Spangenberg et al. |
| 6,397,716 B1 | 6/2002 | Garuglieri |
| 6,412,179 B1 | 7/2002 | Ende |
| 6,502,316 B2 | 1/2003 | Campbell et al. |
| 6,543,143 B2 | 4/2003 | Moore et al. |
| 6,574,874 B2 | 6/2003 | Hartmann |
| 6,588,112 B2 | 7/2003 | Zeiler et al. |
| 6,591,509 B2 | 7/2003 | LeBlanc |
| 6,601,305 B1 | 8/2003 | Fukuoka |
| 6,681,493 B2 | 1/2004 | Mori et al. |
| 6,691,418 B1 | 2/2004 | Lewin et al. |
| 6,708,411 B2 | 3/2004 | Kani |
| 6,758,123 B2 | 7/2004 | Svetlik et al. |
| 6,848,683 B2 | 2/2005 | Foshag et al. |
| 6,878,050 B2 | 4/2005 | Wendt et al. |
| 6,886,259 B2 | 5/2005 | Kani |
| 6,945,523 B2 | 9/2005 | Degen |
| 6,953,394 B2 | 10/2005 | Wendt et al. |
| 6,991,009 B1 | 1/2006 | Wedeward |
| 7,039,548 B2 | 5/2006 | Takano et al. |
| 7,073,266 B2 | 7/2006 | Moore et al. |
| 7,093,828 B2 | 8/2006 | Murray et al. |
| 7,096,588 B2 | 8/2006 | Zeiler et al. |
| 7,114,714 B2 | 10/2006 | Wong |
| 7,191,526 B2 | 3/2007 | Zeiler et al. |
| 7,198,042 B2 | 4/2007 | Harris |
| 7,219,434 B2 | 5/2007 | Moore et al. |
| 7,219,885 B2 | 5/2007 | Nardozza |
| 7,249,548 B2 | 7/2007 | Blanco et al. |
| 7,281,332 B2 | 10/2007 | Niwa et al. |
| 7,300,339 B2 | 11/2007 | Gaul et al. |
| 7,308,764 B2 | 12/2007 | Zeiler et al. |
| 7,434,321 B2 | 10/2008 | Niwa et al. |
| 7,458,301 B2 | 12/2008 | Yu |
| 7,497,152 B2 | 3/2009 | Zeiler et al. |
| 7,516,551 B2 | 4/2009 | Yoshida |
| 7,523,691 B2 | 4/2009 | Terashima et al. |
| 7,549,229 B2 | 6/2009 | Aoyama et al. |
| 7,555,976 B2 | 7/2009 | Logan et al. |
| 7,562,456 B2 | 7/2009 | Roehm et al. |
| 7,621,206 B2 | 11/2009 | Makropoulos |
| D612,715 S | 3/2010 | Weinberg et al. |
| 7,757,592 B2 | 7/2010 | Wilson |
| 7,778,796 B2 | 8/2010 | Takano et al. |
| 7,823,293 B2 | 11/2010 | Walmsley |
| 7,850,154 B2 | 12/2010 | Feuge |
| 7,856,723 B2 | 12/2010 | Thomas et al. |
| 7,866,051 B2 | 1/2011 | Niwa |
| 7,896,323 B2 | 3/2011 | Murray et al. |
| 7,905,166 B2 | 3/2011 | Thomas et al. |
| 7,908,952 B2 | 3/2011 | Wilson et al. |
| 7,926,397 B2 | 4/2011 | Logan et al. |
| 7,958,641 B1 | 6/2011 | Ende |
| 7,975,388 B2 | 7/2011 | Fuchs et al. |
| 8,056,243 B2 * | 11/2011 | Sargeant .............. B27B 9/02 30/388 |
| 8,060,235 B2 | 11/2011 | Johnson et al. |
| 8,061,043 B2 | 11/2011 | Allen et al. |
| 8,181,559 B1 | 5/2012 | End |
| 8,201,483 B2 | 6/2012 | Wilson |
| 8,209,872 B1 | 7/2012 | Ende |
| 8,220,372 B2 | 7/2012 | Janson |
| 8,230,768 B2 | 7/2012 | Ozawa et al. |
| 8,267,389 B2 | 9/2012 | Roesch et al. |

(56) References Cited

U.S. PATENT DOCUMENTS

| | | |
|---|---|---|
| 8,272,133 B2 | 9/2012 | Wascow |
| 8,313,095 B2 | 11/2012 | Kloepfer et al. |
| 8,359,959 B2 | 1/2013 | Aoyama et al. |
| 8,439,339 B2 | 5/2013 | Roesch et al. |
| 8,479,401 B2 | 7/2013 | Barkley |
| 8,485,078 B2 | 7/2013 | Janson |
| 8,588,959 B2 | 11/2013 | Johnson et al. |
| 8,616,108 B2 | 12/2013 | Lukas et al. |
| 8,640,346 B2 | 2/2014 | Allen et al. |
| 8,641,024 B1 | 2/2014 | Murray et al. |
| 8,661,957 B2 | 3/2014 | Aoyama et al. |
| 8,671,811 B2 | 3/2014 | Rybka |
| 8,684,052 B2 | 4/2014 | Breitenbach |
| 8,985,566 B2 | 3/2015 | Chuang |
| 9,038,516 B2 | 5/2015 | Chen et al. |
| 9,044,869 B2 | 6/2015 | Xing et al. |
| 9,156,184 B2 | 10/2015 | Stoffel |
| 9,308,626 B2 | 4/2016 | Chuang |
| 9,427,848 B1 | 8/2016 | Murray et al. |
| 9,475,140 B2 | 10/2016 | Kume et al. |
| 9,522,479 B2 | 12/2016 | Boehme et al. |
| 9,623,583 B2 | 4/2017 | Sinzig et al. |
| 9,744,650 B2 | 8/2017 | Kregloski |
| 9,751,139 B2 | 9/2017 | Groth |
| 9,908,256 B2 | 3/2018 | Sinzig et al. |
| 9,937,638 B2 | 4/2018 | Numata |
| 9,981,402 B2 | 5/2018 | Cuenca |
| 10,005,199 B2 | 6/2018 | Sinzig et al. |
| 10,099,398 B2 | 10/2018 | Wang |
| D846,365 S | 4/2019 | Wang |
| 10,272,544 B1 | 4/2019 | Murray et al. |
| 10,363,682 B2 | 7/2019 | Firth |
| 10,442,058 B2 | 10/2019 | Wang |
| 10,456,944 B2 | 10/2019 | Ursell et al. |
| 10,471,624 B2 | 11/2019 | Baxivanelis |
| 10,486,251 B2 | 11/2019 | Nakashima |
| 10,518,343 B2 | 12/2019 | Ogino et al. |
| 2001/0022027 A1 | 9/2001 | Campbell et al. |
| 2002/0059731 A1* | 5/2002 | Zeiler ............... B27B 9/00 30/388 |
| 2003/0233925 A1 | 12/2003 | Makropoulos |
| 2003/0233926 A1 | 12/2003 | Makropoulos |
| 2005/0061128 A1 | 3/2005 | Caughlin et al. |
| 2006/0011032 A1 | 1/2006 | Brown et al. |
| 2006/0011034 A1 | 1/2006 | Gehret et al. |
| 2006/0086219 A1 | 4/2006 | Zeiler et al. |
| 2006/0107536 A1 | 5/2006 | Buck et al. |
| 2006/0117579 A1 | 6/2006 | Zeiler et al. |
| 2006/0117920 A1 | 6/2006 | Zeiler et al. |
| 2006/0191387 A1 | 8/2006 | Weber et al. |
| 2006/0283024 A1 | 12/2006 | Wilson et al. |
| 2007/0007702 A1 | 1/2007 | Brandl |
| 2007/0144319 A1 | 6/2007 | Jones |
| 2007/0157781 A1 | 7/2007 | Wilson et al. |
| 2007/0157782 A1 | 7/2007 | Hetcher et al. |
| 2007/0180710 A1 | 8/2007 | Moore et al. |
| 2007/0222130 A1 | 9/2007 | Leinbach et al. |
| 2008/0041209 A1 | 2/2008 | Li |
| 2009/0126206 A1 | 5/2009 | Chung et al. |
| 2009/0133559 A1 | 5/2009 | Sargeant et al. |
| 2009/0308218 A1 | 12/2009 | Raff et al. |
| 2010/0156015 A1 | 6/2010 | Klein et al. |
| 2011/0025265 A1 | 2/2011 | Mochida et al. |
| 2011/0072943 A1 | 3/2011 | Chen |
| 2011/0083540 A1 | 4/2011 | Xing et al. |
| 2011/0219628 A1 | 9/2011 | Harrison et al. |
| 2012/0079931 A1 | 4/2012 | Hansen |
| 2012/0132049 A1 | 5/2012 | Bokelaar |
| 2012/0247299 A1 | 10/2012 | Wilson |
| 2012/0317823 A1 | 12/2012 | Vantran et al. |
| 2013/0318801 A1 | 12/2013 | Nicholson |
| 2014/0026725 A1 | 1/2014 | Makropoulos |
| 2014/0047967 A1 | 2/2014 | Makropoulos |
| 2014/0103595 A1 | 4/2014 | Yang |
| 2014/0290458 A1 | 10/2014 | Sinzig et al. |
| 2014/0345436 A1 | 11/2014 | Behrisch |
| 2015/0047484 A1 | 2/2015 | Lane |
| 2015/0059186 A1 | 3/2015 | Bermes et al. |
| 2015/0135922 A1 | 5/2015 | Bokelaar |
| 2015/0321374 A1 | 11/2015 | Ursell et al. |
| 2015/0375389 A1 | 12/2015 | Semann |
| 2016/0243631 A1 | 8/2016 | Brewster et al. |
| 2016/0279764 A1 | 9/2016 | Thomas |
| 2017/0120353 A1 | 5/2017 | Tennant et al. |
| 2017/0159793 A1 | 6/2017 | Schorpp et al. |
| 2017/0348829 A1 | 12/2017 | Kregloski |
| 2018/0071955 A1 | 3/2018 | Rybka et al. |
| 2018/0093335 A1 | 4/2018 | Hart |
| 2018/0290328 A1 | 10/2018 | Zuler |
| 2018/0345523 A1 | 12/2018 | Ursell et al. |
| 2018/0361612 A1 | 12/2018 | Wang |
| 2019/0039258 A1 | 2/2019 | Lee |
| 2019/0044415 A1 | 2/2019 | Hatfield et al. |
| 2019/0076940 A1 | 3/2019 | Crabb et al. |
| 2019/0091779 A1 | 3/2019 | Crabb et al. |
| 2019/0143555 A1 | 5/2019 | Nakashima |
| 2019/0217446 A1 | 7/2019 | Wang |
| 2019/0217447 A1 | 7/2019 | Wang |
| 2019/0232400 A1 | 8/2019 | Ender |
| 2019/0329337 A1 | 10/2019 | Owens et al. |
| 2019/0381632 A1 | 12/2019 | Wang et al. |
| 2019/0388984 A1 | 12/2019 | Kuragano |
| 2020/0023541 A1 | 1/2020 | Strempke et al. |
| 2020/0086405 A1 | 3/2020 | Ogino et al. |
| 2020/0180117 A1 | 6/2020 | Kloepfer et al. |
| 2020/0398454 A1 | 12/2020 | Zsuponyo |
| 2021/0060811 A1 | 3/2021 | Kani et al. |
| 2023/0158586 A1* | 5/2023 | Rau ............... B27B 5/32 30/388 |
| 2023/0264275 A1 | 8/2023 | Dutterer |
| 2023/0294184 A1 | 9/2023 | Kour et al. |

FOREIGN PATENT DOCUMENTS

| | | |
|---|---|---|
| CN | 100448635 C | 1/2009 |
| CN | 101537595 B | 4/2011 |
| CN | 102407571 A | 4/2012 |
| CN | 102744458 A | 10/2012 |
| CN | 203031036 U | 7/2013 |
| CN | 203140888 U | 8/2013 |
| CN | 102814549 B | 9/2014 |
| CN | 104511949 A | 4/2015 |
| CN | 204524406 U | 8/2015 |
| CN | 103418842 B | 9/2015 |
| CN | 204914075 U | 12/2015 |
| CN | 205020943 U | 2/2016 |
| CN | 205184946 U | 4/2016 |
| CN | 205200693 U | 5/2016 |
| CN | 205888243 U | 1/2017 |
| CN | 104722837 B | 4/2017 |
| CN | 206425620 U | 8/2017 |
| CN | 105921811 B | 8/2018 |
| CN | 208392223 U | 1/2019 |
| CN | 208614252 U | 3/2019 |
| CN | 209350095 U | 9/2019 |
| CN | 210475706 U | 5/2020 |
| DE | 2413816 A1 | 10/1975 |
| DE | 2542322 A1 | 3/1977 |
| DE | 7820060 U1 | 10/1978 |
| DE | 2829297 A1 | 1/1980 |
| DE | 3007310 C2 | 8/1983 |
| DE | 3315169 A1 | 11/1983 |
| DE | 3308199 A1 | 9/1984 |
| DE | 2547459 C2 | 11/1984 |
| DE | 3420183 A1 | 12/1985 |
| DE | 3434469 A1 | 3/1986 |
| DE | 8604618 U1 | 4/1986 |
| DE | 3500371 A1 | 7/1986 |
| DE | 3540410 A1 | 5/1987 |
| DE | 3609809 A1 | 9/1987 |
| DE | 8706730 U1 | 9/1987 |
| DE | 3633655 A1 | 4/1988 |
| DE | 8803627 U1 | 5/1988 |
| DE | 8807584 U1 | 7/1988 |

(56) References Cited

FOREIGN PATENT DOCUMENTS

| | | |
|---|---|---|
| DE | 3718232 A1 | 9/1988 |
| DE | 3807516 C1 | 6/1989 |
| DE | 8905442 U1 | 6/1989 |
| DE | 3806814 A1 | 9/1989 |
| DE | 9003772 U1 | 6/1990 |
| DE | 3906300 A1 | 8/1990 |
| DE | 3912307 A1 | 10/1990 |
| DE | 3919702 A1 | 12/1990 |
| DE | 3943134 A1 | 7/1991 |
| DE | 4023101 A1 | 1/1992 |
| DE | 9016090 U1 | 4/1992 |
| DE | 9112286 U1 | 2/1993 |
| DE | 4130174 A1 | 3/1993 |
| DE | 4212460 A1 | 10/1993 |
| DE | 9319867 U1 | 4/1994 |
| DE | 9420679 U1 | 2/1995 |
| DE | 19507062 A1 | 8/1995 |
| DE | 3606525 C2 | 5/1996 |
| DE | 29510061 U1 | 10/1996 |
| DE | 3104733 C3 | 1/1997 |
| DE | 3635159 C2 | 5/1998 |
| DE | 29801989 U1 | 8/1998 |
| DE | 29809921 U1 | 10/1998 |
| DE | 19751599 A1 | 5/1999 |
| DE | 29907474 U1 | 7/1999 |
| DE | 29820244 U1 | 3/2000 |
| DE | 20012674 U1 | 2/2001 |
| DE | 20017862 U1 | 2/2001 |
| DE | 20100087 U1 | 3/2001 |
| DE | 10025077 A1 | 4/2001 |
| DE | 20002160 U1 | 6/2001 |
| DE | 10007294 A1 | 8/2001 |
| DE | 10011740 A1 | 9/2001 |
| DE | 20119603 U1 | 2/2002 |
| DE | 10159485 A1 | 7/2002 |
| DE | 20213291 U1 | 10/2002 |
| DE | 20023085 U1 | 12/2002 |
| DE | 20219273 U1 | 2/2003 |
| DE | 19507286 C2 | 6/2003 |
| DE | 20317950 U1 * | 4/2004 ......... B23Q 11/0092 |
| DE | 10360373 B3 | 3/2005 |
| DE | 102004017420 A1 | 11/2005 |
| DE | 202006004228 U1 | 6/2006 |
| DE | 102006034136 A1 | 4/2007 |
| DE | 202005019483 U1 | 4/2007 |
| DE | 202006006140 U1 | 8/2007 |
| DE | 102006057951 A1 | 6/2008 |
| DE | 102006060822 A1 | 6/2008 |
| DE | 102008059838 A1 | 6/2010 |
| DE | 102009060088 A1 | 8/2010 |
| DE | 102004002275 B4 | 5/2011 |
| DE | 102006011280 B4 | 8/2011 |
| DE | 10334757 B4 | 2/2012 |
| DE | 102011103476 A1 | 12/2012 |
| DE | 202012009204 U1 | 1/2013 |
| DE | 202013100111 U1 | 2/2013 |
| DE | 102011114375 A1 | 3/2013 |
| DE | 102011116873 A1 | 4/2013 |
| DE | 102011089555 A1 | 6/2013 |
| DE | 102006025137 B4 | 8/2013 |
| DE | 202013104555 U1 | 10/2013 |
| DE | 102005021789 B4 | 3/2014 |
| DE | 202014103166 U1 | 8/2014 |
| DE | 102014010486 A1 | 1/2016 |
| DE | 102015225392 A1 | 6/2017 |
| DE | 202018105381 U1 | 10/2018 |
| DE | 202018107178 U1 | 1/2019 |
| DE | 202018100612 U1 | 5/2019 |
| DE | 102018112324 A1 | 11/2019 |
| EP | 0012404 B1 | 5/1983 |
| EP | 0204023 B1 | 6/1989 |
| EP | 0246417 B1 | 9/1990 |
| EP | 0525437 A2 | 2/1993 |
| EP | 0459121 B1 | 11/1994 |
| EP | 0598088 B1 | 9/1995 |
| EP | 0496047 B1 | 2/1996 |
| EP | 0712686 A1 | 5/1996 |
| EP | 0765716 A1 | 4/1997 |
| EP | 0642896 B1 | 10/1997 |
| EP | 1279467 A1 | 1/2003 |
| EP | 0925893 B1 | 4/2004 |
| EP | 0990492 B1 | 11/2004 |
| EP | 1193036 B1 | 5/2005 |
| EP | 1361019 B1 | 10/2005 |
| EP | 1418018 B1 | 5/2006 |
| EP | 1457299 B1 | 8/2006 |
| EP | 1522394 B1 | 7/2008 |
| EP | 2045055 A2 | 4/2009 |
| EP | 1892056 B1 | 5/2009 |
| EP | 2082832 A2 | 7/2009 |
| EP | 1964648 B1 | 12/2010 |
| EP | 2075080 B1 | 5/2011 |
| EP | 2581166 B1 | 9/2014 |
| EP | 2335892 B1 | 5/2015 |
| EP | 2412499 B1 | 7/2015 |
| EP | 2567796 B1 | 9/2015 |
| EP | 2412489 B1 | 6/2016 |
| EP | 2581167 B1 | 7/2016 |
| EP | 2412486 B1 | 10/2016 |
| EP | 2638997 B1 | 11/2016 |
| EP | 2250005 B1 | 3/2017 |
| EP | 2881228 B1 | 3/2017 |
| EP | 2762282 B1 | 3/2018 |
| EP | 2638995 B1 | 4/2019 |
| EP | 2638996 B1 | 5/2019 |
| EP | 2881229 B1 | 5/2019 |
| EP | 2641710 B1 | 7/2019 |
| FR | 2527497 A1 | 12/1983 |
| GB | 2302058 A | 1/1997 |
| GB | 2362128 A | 11/2001 |
| JP | H047101 U | 1/1992 |
| JP | 2000071120 A | 3/2000 |
| JP | 2007136794 A | 6/2007 |
| JP | 4204749 B2 | 1/2009 |
| JP | 2019030938 A | 2/2019 |
| WO | WO9213672 A1 | 8/1992 |
| WO | WO9301922 A1 | 2/1993 |
| WO | WO9309913 A1 | 5/1993 |
| WO | WO02060642 A1 | 8/2002 |
| WO | WO2003000451 A2 | 1/2003 |
| WO | WO2009095300 A1 | 8/2009 |
| WO | WO2009147152 A1 | 12/2009 |
| WO | WO2011047663 A2 | 4/2011 |
| WO | WO2011085681 A1 | 7/2011 |
| WO | WO2015007032 A1 | 1/2015 |
| WO | WO2015014038 A1 | 2/2015 |
| WO | WO2015036604 A1 | 3/2015 |
| WO | WO2016128232 A1 | 8/2016 |
| WO | WO2016128233 A1 | 8/2016 |
| WO | WO2018148792 A1 | 8/2018 |
| WO | WO2019063685 A1 | 4/2019 |
| WO | WO2019238511 A2 | 12/2019 |
| WO | 2021116479 A1 | 6/2021 |

* cited by examiner

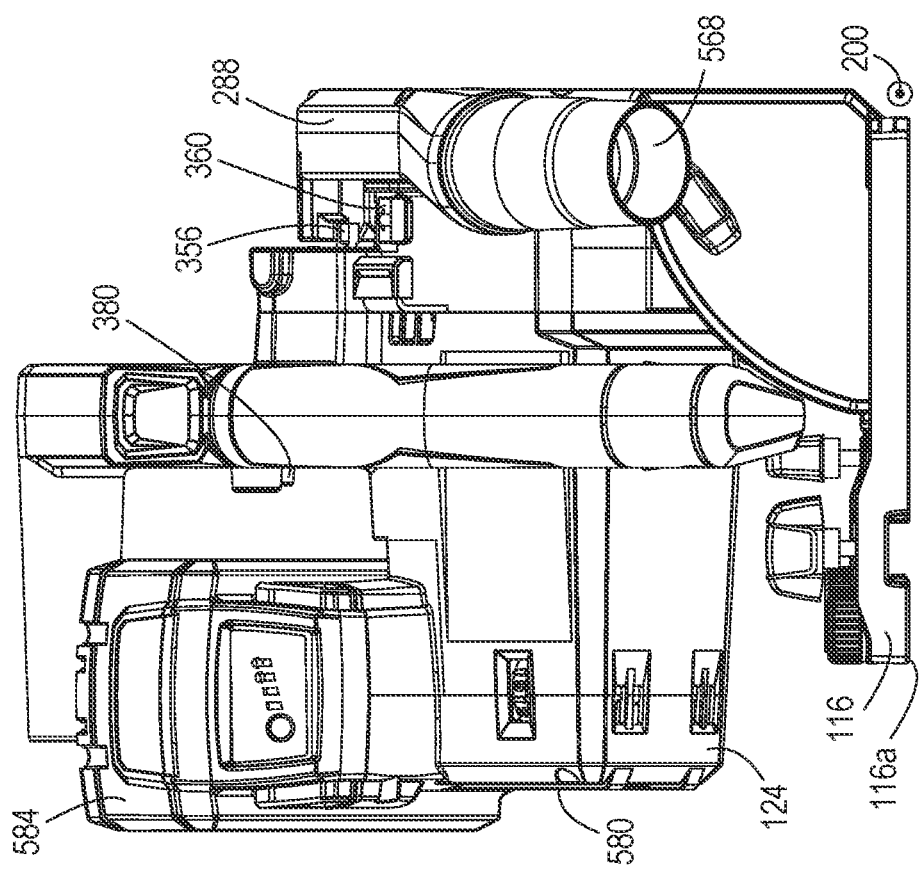
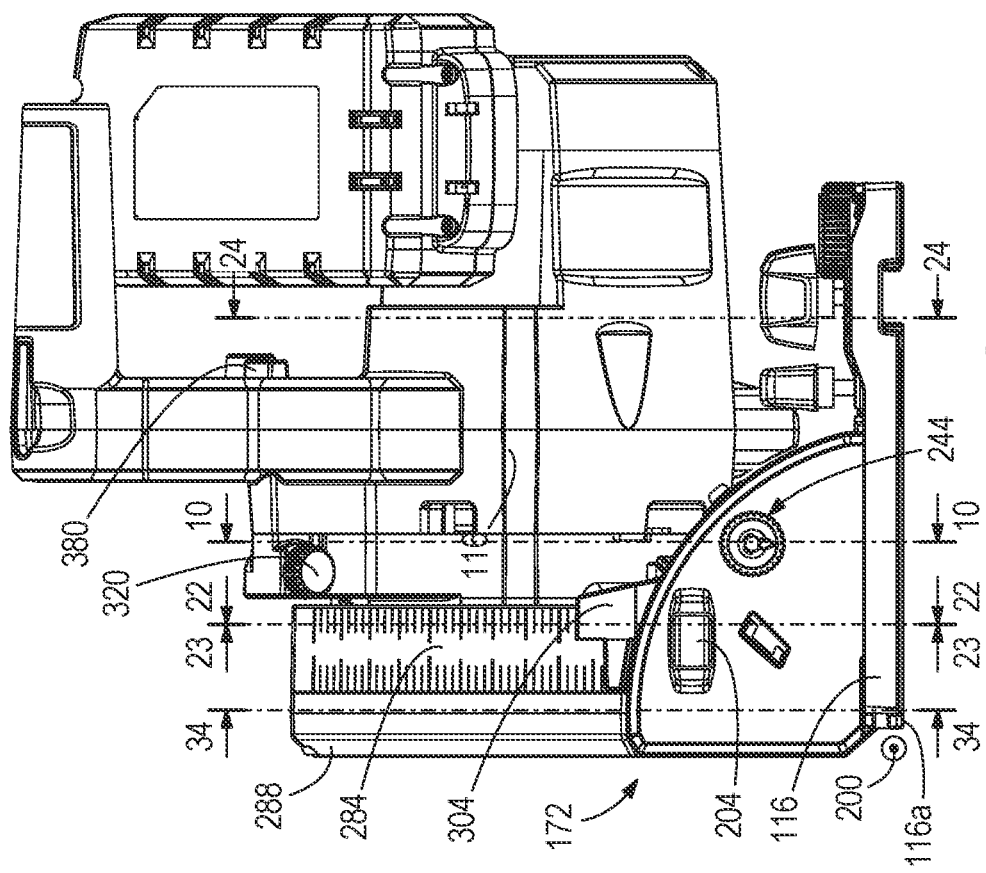

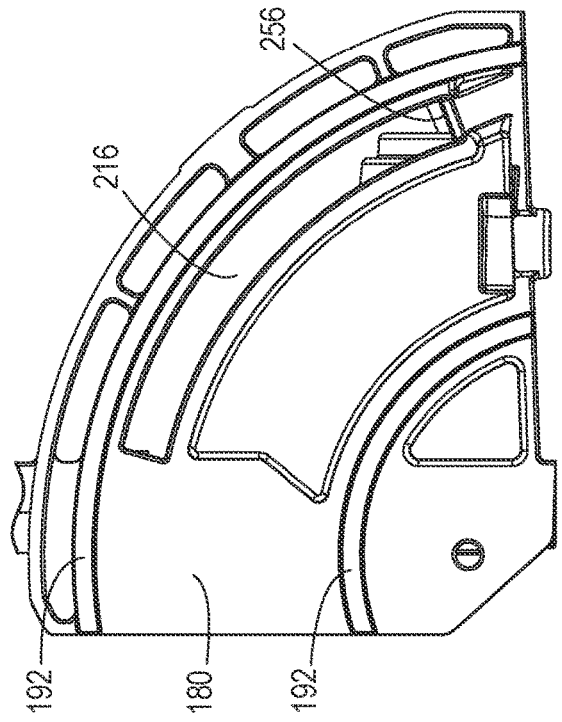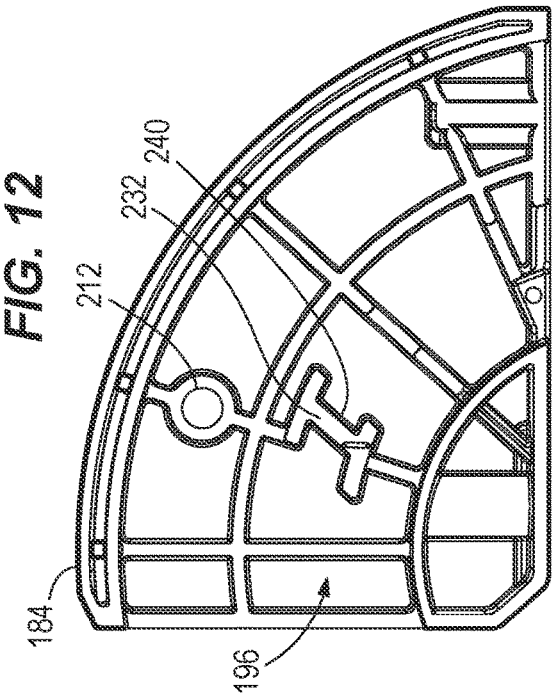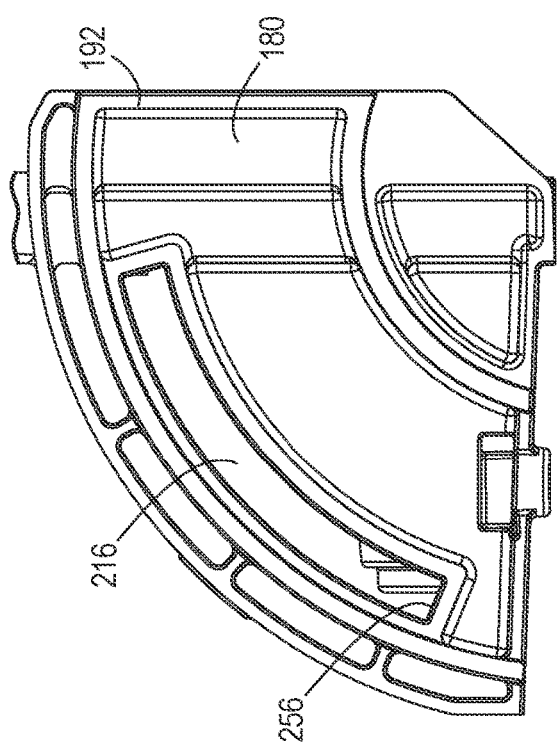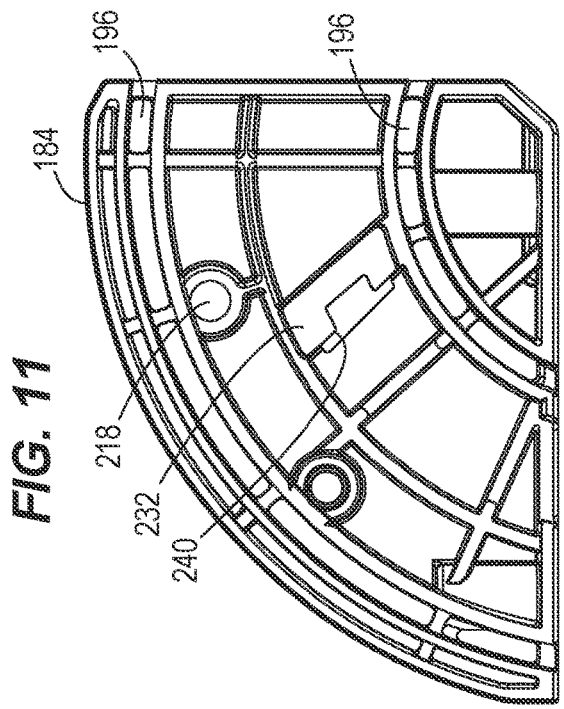

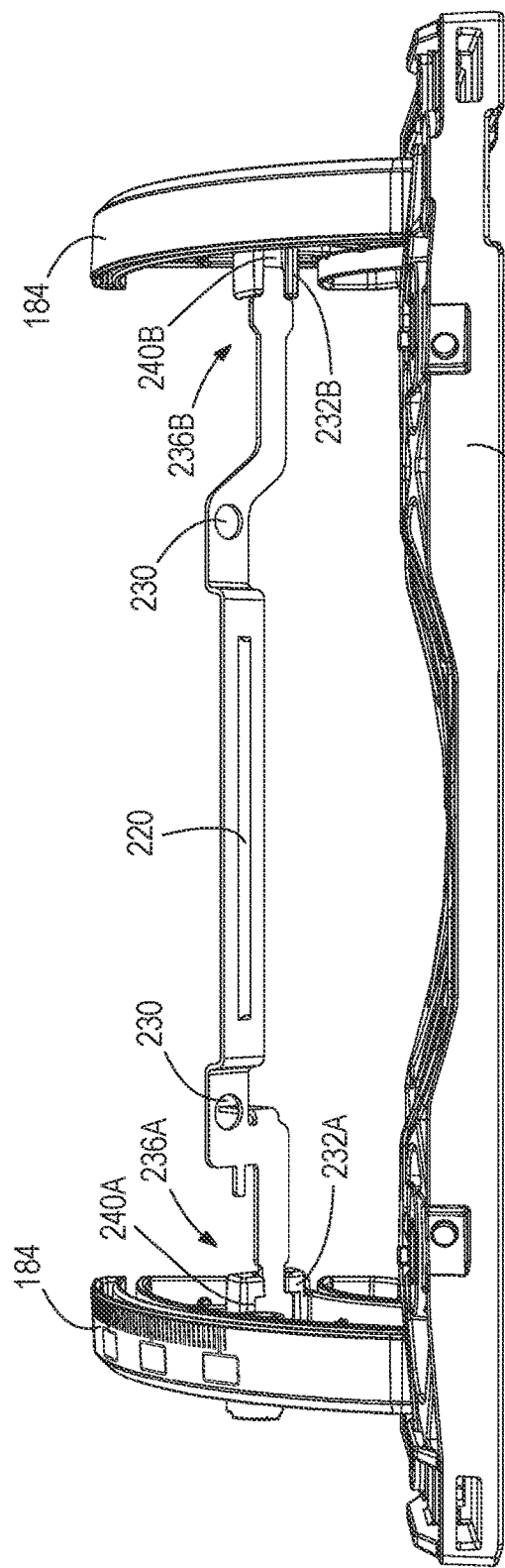
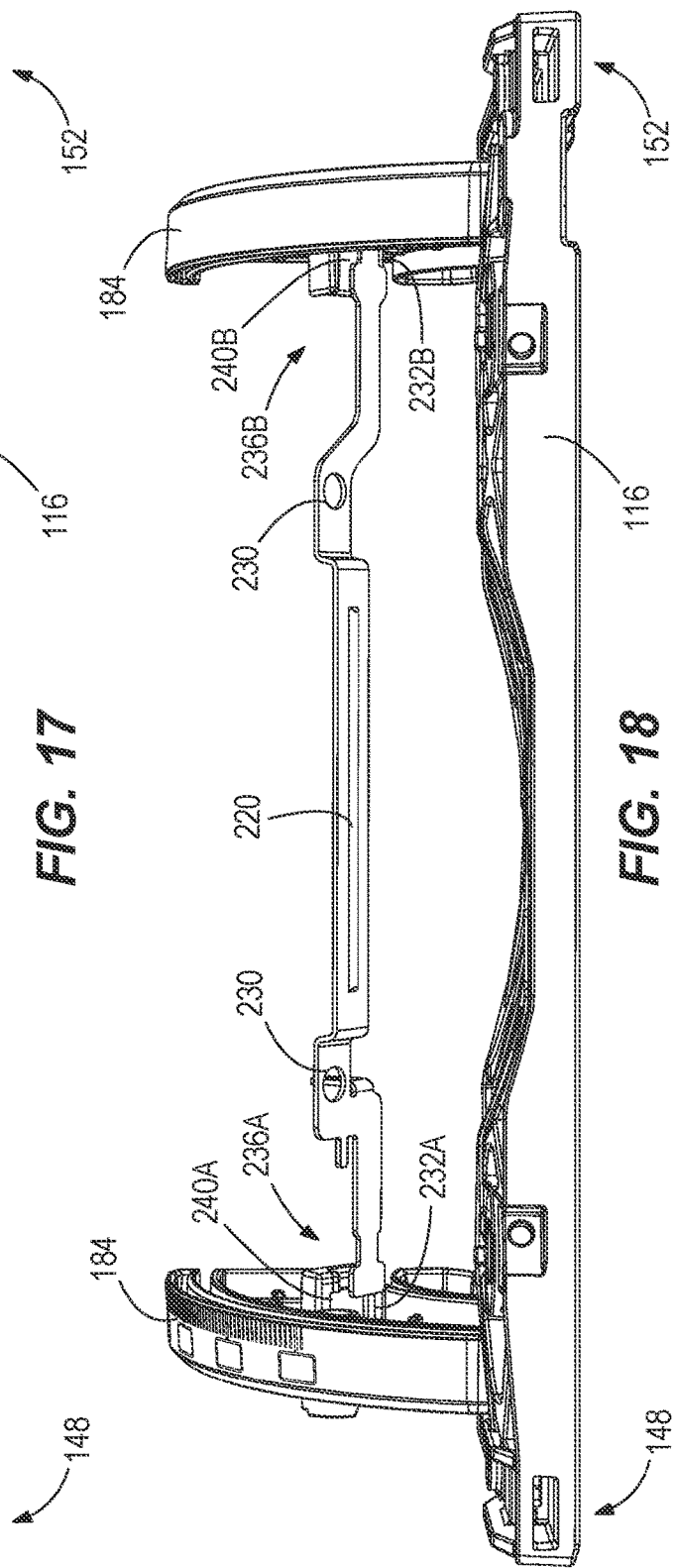

CIRCULAR SAW

CROSS-REFERENCE TO RELATED APPLICATIONS

This application claims priority to U.S. Provisional Patent Application No. 63/117,119 filed on Nov. 23, 2020, the entire content of which is incorporated herein by reference.

FIELD OF THE INVENTION

The present invention relates to power tools, and more particularly to track saws.

BACKGROUND OF THE INVENTION

Track saws are used to make straight or beveled cuts in a work piece. Typically, track saws are used to make relatively long straight cuts in sheet materials such as wood, plywood, aluminum, steel, and other metals. Such track saws include a track, which is supported on the work piece, and a saw that translates along the track. Preferably, the interface between the track and the saw allows a user to make a straight, beveled or non-beveled cut in the work piece.

SUMMARY OF THE INVENTION

The invention provides, in one aspect, a circular saw comprising a shoe, a saw unit, and a plunge lockout mechanism. The shoe includes an upper surface and an opposite, lower surface. The saw unit includes a circular saw blade, and is coupled to the shoe between a first position in which the saw blade does not protrude beyond the lower surface of the shoe, and a second position in which the saw blade protrudes beyond the lower surface of the shoe. The plunge lockout mechanism is coupled to the saw unit for movement therewith between the first position and the second position. The plunge lockout mechanism includes an actuator a latch engaged by the actuator in response to translating movement thereof, the latch rotatable about a pivot between a locked position and an unlocked position. In the locked position, the plunge lockout mechanism prevents the movement of the saw unit from the first position to the second position. In the unlocked position, the plunge lockout mechanism allows engagement of the trigger and movement of the saw unit from the first position to the second position.

The invention provides, in another independent aspect, a circular saw comprising a shoe, a saw unit, a depth scale, and a depth stop. The shoe includes an upper surface and an opposite, lower surface. The saw unit includes a circular saw blade, and is pivotably coupled to the shoe between a first position in which the saw blade does not protrude beyond the lower surface of the shoe, and a second position in which the saw blade protrudes beyond the lower surface of the shoe. The depth scale extends from the upper surface of the shoe. The depth stop includes a stop body, a button, and a spring biasing the button away from the stop body. The button is movable between a locked position in which the stop body is locked to the depth scape and an unlocked position in which the stop body is movable along the depth scale to a location coinciding with a desired cutting depth of the saw blade beyond the lower surface of the shoe. The spring biases the button to the locked position.

The invention provides, in another independent aspect, a circular saw comprising a shoe, a saw unit, and a bevel angle adjustment mechanism. The shoe includes an upper surface and an opposite, lower surface defining a shoe plane. The saw unit includes a circular saw blade, and is pivotably coupled to the shoe between a first position in which the saw blade does not protrude beyond the lower surface of the shoe, and a second position in which the saw blade protrudes beyond the lower surface of the shoe. The depth scale extends from the upper surface of the shoe. The bevel angle adjustment mechanism operable to adjust a bevel angle about a bevel axis between the saw unit and the shoe, the bevel angle adjustment mechanism including a carriage plate coupled to the saw unit for movement therewith and a shoe plate fixedly coupled to the shoe, the carriage plate having an arcuate slide and the shoe plate having an arcuate raceway. A bevel angle between the blade plane and the shoe plane is adjustable in response to sliding movement of the arcuate slide relative to the arcuate raceway.

The invention provides, in another independent aspect, a circular saw comprising a shoe, a saw unit, a bevel angle adjustment mechanism, and a linkage. The shoe includes an upper surface and an opposite, lower surface defining a shoe plane. The saw unit includes a circular saw blade, and is pivotably coupled to the shoe between a first position in which the saw blade does not protrude beyond the lower surface of the shoe, and a second position in which the saw blade protrudes beyond the lower surface of the shoe. The bevel angle adjustment mechanism is operable to adjust a bevel angle about a bevel axis between the saw unit and the shoe. The linkage is operable to shift between a first position and a second position. In the first position of the linkage, the bevel angle is restricted within a first bevel angle range having an upper bound and a lower bound. In the second position of the linkage, the bevel angle is restricted within a bevel angle range having an upper bound higher than the upper bound of the first position and a lower bound lower than the lower bound of the first position.

The invention provides, in another independent aspect, a circular saw comprising a shoe, a saw unit, a blade guard, and a blade window. The shoe includes an upper surface and an opposite, lower surface. The saw unit includes a circular saw blade, and is pivotably coupled to the shoe between a first position in which the saw blade does not protrude beyond the lower surface of the shoe, and a second position in which the saw blade protrudes beyond the lower surface of the shoe. The saw unit further includes a blade guard enclosing a portion of the saw blade and having a connecting member and an aperture. The blade window is transparent. The blade window engaging the connecting member and covering the aperture, the blade window providing a user with a visual indication of a location of the saw blade.

The invention provides, in another independent aspect, a circular saw comprising a shoe, a saw unit, a blade guard, and a splinter guard. The shoe includes an upper surface and an opposite, lower surface. The saw unit includes a circular saw blade, and is pivotably coupled to the shoe between a first position in which the saw blade does not protrude beyond the lower surface of the shoe, and a second position in which the saw blade protrudes beyond the lower surface of the shoe. The saw unit further includes a blade guard enclosing at least a portion of the blade. The blade guard has a connecting member and an aperture. The splinter guard engaging the connecting member and covering the aperture, the splinter guard abutting the work piece to prevent splintering of the work piece during a cutting operation.

The invention provides, in another independent aspect, a track saw assembly comprising a track and a track saw. The track having a rail with a rail width. The track saw includes a shoe and a track interface. The shoe has an upper surface and an opposite, lower surface defining a channel configured to slide along the rail, the channel having a channel width greater than the rail width, and also having a pad integrally formed with the shoe. The track interface includes an actuator, an eccentric component, and a rail engaging member. The actuator is configured to receive a user input and transfer the user input to the eccentric component which, in turn, is configured to adjust the location of the rail engaging member. The track interface is adjustable by moving the actuator such that the rail engaging member extends into the channel to a track interface width smaller than the channel width, the track interface width defined between the pad and the rail engaging member.

The invention provides, in another independent aspect, a circular saw comprising a shoe, a saw unit, and a scoring stop. The shoe includes an upper surface and an opposite, lower surface. The saw unit includes a circular saw blade, and is pivotably coupled to the shoe between a first position in which the saw blade does not protrude beyond the lower surface of the shoe, and a second position in which the saw blade protrudes beyond the lower surface of the shoe. The scoring stop is movable between a scoring position in which plunging of the saw unit is permitted within a first depth range between the first position and a third position between the first position and the second position and a plunging position in which plunging of the saw unit is permitted within a second depth range between the first position and the second position.

The invention provides, in another independent aspect, a clamp assembly comprising a track and a clamp. The track extends along a longitudinal axis, the track has a support surface operable to support the track on a workpiece and a rail extending in a direction away from the support surface and defining an interior rail surface. The clamp includes a bar, a cross-bar, and a threaded rod. The bar includes a rail engagement portion dimensioned to slidably engage the interior rail surface of the track and a cross-bar engagement portion extending beyond the support surface from the interior rail surface. A first end of the cross-bar is dimensioned to slidably engage the cross-bar engagement portion of the bar and a second end of the cross-bar receives the threaded rod. The threaded rod is movable relative to the support surface to clamp the workpiece with the track.

The invention provides, in another independent aspect, a track for use with a circular saw. The track comprising a body having workpiece side, a tool side, a circular saw blade-facing edge, and a distal edge opposite the blade-facing edge. The track is made of a material having a first coefficient of friction. The track further comprises a support surface, a first rail, a second rail, an edge strip, a first sliding strip, and a second sliding strip. The support surface is adjacent the workpiece side to support the track on a workpiece. The support surface has a second coefficient of friction higher than the first coefficient of friction. The first rail extends in a direction away from the support surface to a closed end. The first rail has an open end opposite the closed end, the first rail being operable to support a tool on the track for translation of the tool along the longitudinal axis. The second rail has an open end adjacent the tool side and has a closed end adjacent the workpiece side. The second rail is operable to support a device on the track for translation of the device along the longitudinal axis. The second rail is adjacent the distal edge. The edge strip is adjacent the blade-facing edge and is configured to be cut during a first use of the track. The first sliding strip is located on the tool side between the first rail and the second rail. The second sliding strip is located on the tool side between the first rail and the blade-facing edge. The first sliding strip and the second sliding strip have a third coefficient of friction less than the first coefficient of friction.

Finally, the invention provides, in another independent aspect, a circular saw comprising a shoe, a saw unit, a bevel angle adjustment mechanism, and an intermediate bevel stop. The stop includes an upper surface an opposite, lower surface defining a shoe plane. The saw unit includes a circular saw blade, and is pivotably coupled to the shoe between a first position in which the saw blade does not protrude beyond the lower surface of the shoe, and a second position in which the saw blade protrudes beyond the lower surface of the shoe. The bevel angle adjustment mechanism is operable to adjust a bevel angle about a bevel axis between the saw unit and the shoe. The intermediate bevel stop includes an actuator, a biasing member, and a shaft. The actuator is configured to receive user input to move the shaft between an engaged position and a disengaged position. In the engaged position, the shaft is positioned within a slot of the bevel angle adjustment mechanism and is configured to stop the saw unit at an intermediate bevel angle relative to the shoe. In the disengaged position, the pin is removed from the slot.

BRIEF DESCRIPTION OF THE DRAWINGS

FIG. 4 is a front view of the track saw of FIG. 1.

FIG. 5 is a rear view of the track saw of FIG. 1.

FIG. 11 is a front view of a carriage plate of a rear bevel hinge.

FIG. 12 is a rear view of the carriage plate of a front bevel hinge.

FIG. 13 is a rear view of the shoe plate of the front bevel hinge.

FIG. 14 is a front view of the shoe plate of the rear bevel hinge.

FIG. 17 is a first side isometric view of the linkage in a first position.

FIG. 18 is a first side isometric view of the linkage in a second position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
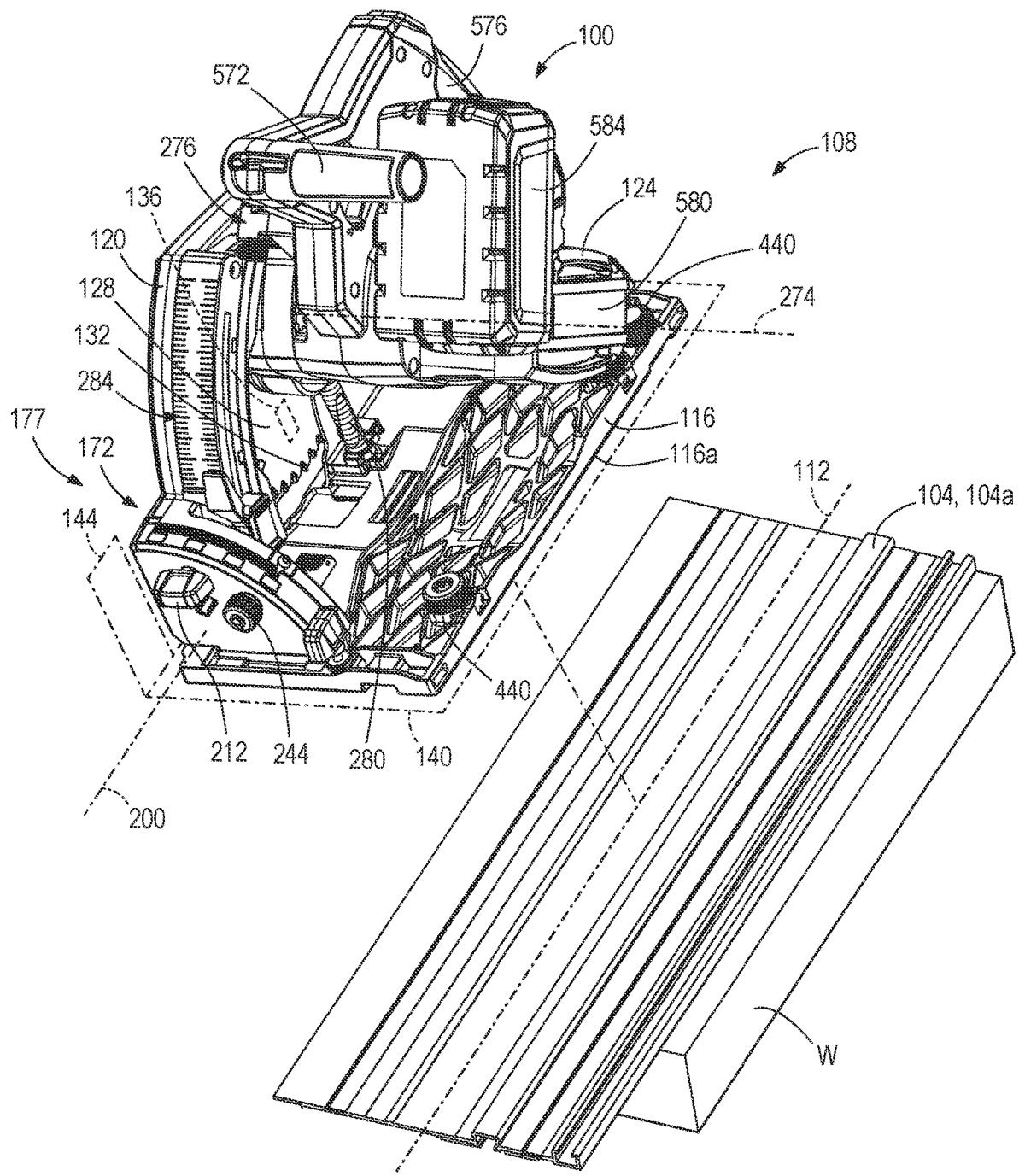
FIG. 1 is a perspective view of a track saw assembly including a track saw and a track.
Figure 27:
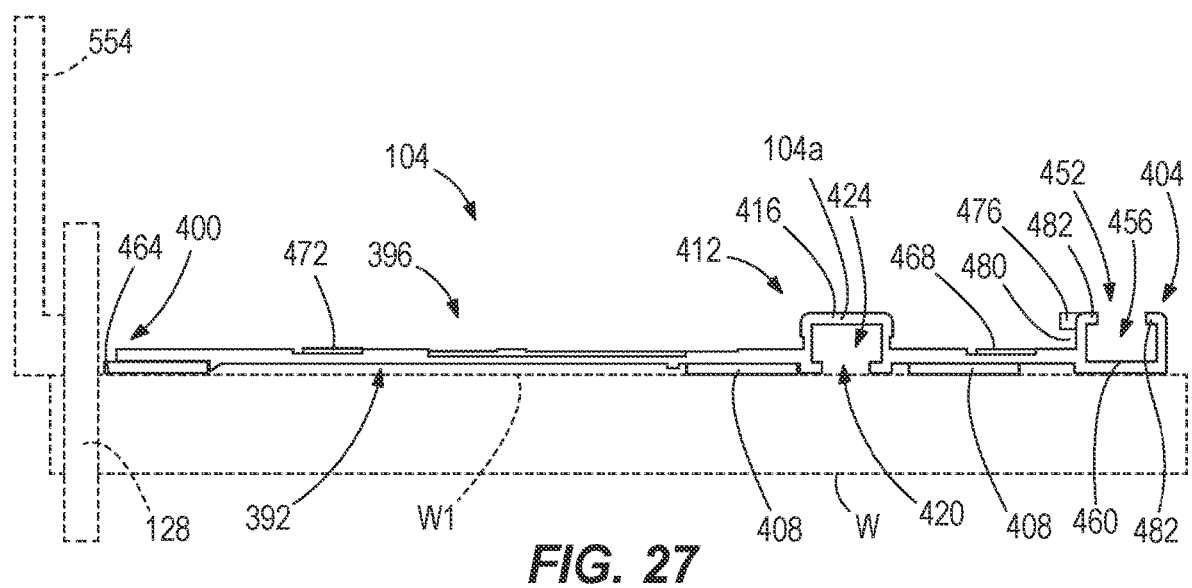
FIG. 27 is a cross sectional view of the track taken perpendicular to the longitudinal axis of the track.

FIG. 1 illustrates a plunging circular saw, such as a track saw 100, for use with a track 104. The combined track saw 100 and track 104 create a track saw assembly 108. The track saw assembly 108 may rest upon a work piece W. The track saw 100 rests upon a track body (i.e., a body) 104a of the track 104 and is translated along a longitudinal axis 112 of the track 104 to make a cut in the work piece W. The track saw 100 includes a shoe 116, an upstanding carriage 120, and a saw unit 124 supported on the shoe 116 and the carriage 120. The saw unit 124 includes a blade 128 having a lowermost portion 132 and defining a blade plane 136. A bottom surface 116a of the shoe 116 defines a shoe plane 140. As illustrated in FIG. 27, when the track 104 rests upon the work piece W, the shoe plane 140 is parallel with an upper surface W1 of the work piece W. A vertical reference plane 144 extends perpendicularly upward from the shoe plane 140.

With continued reference to FIG. 1, the saw unit 124 of the track saw 100 includes a drive unit 580 including an electric motor (e.g., a brushless electric direct-current motor 580) for providing torque to the saw blade 128 causing it to rotate. The drive unit 580 may also include a gear train or transmission between the motor 580 and the saw blade 128 to adjust the magnitude of torque transmitted to the blade 128. In the illustrated embodiment, the drive unit 580 is powered by a removable battery pack 584. However, the drive unit 580 may be powered by another power source.

Figure 6:
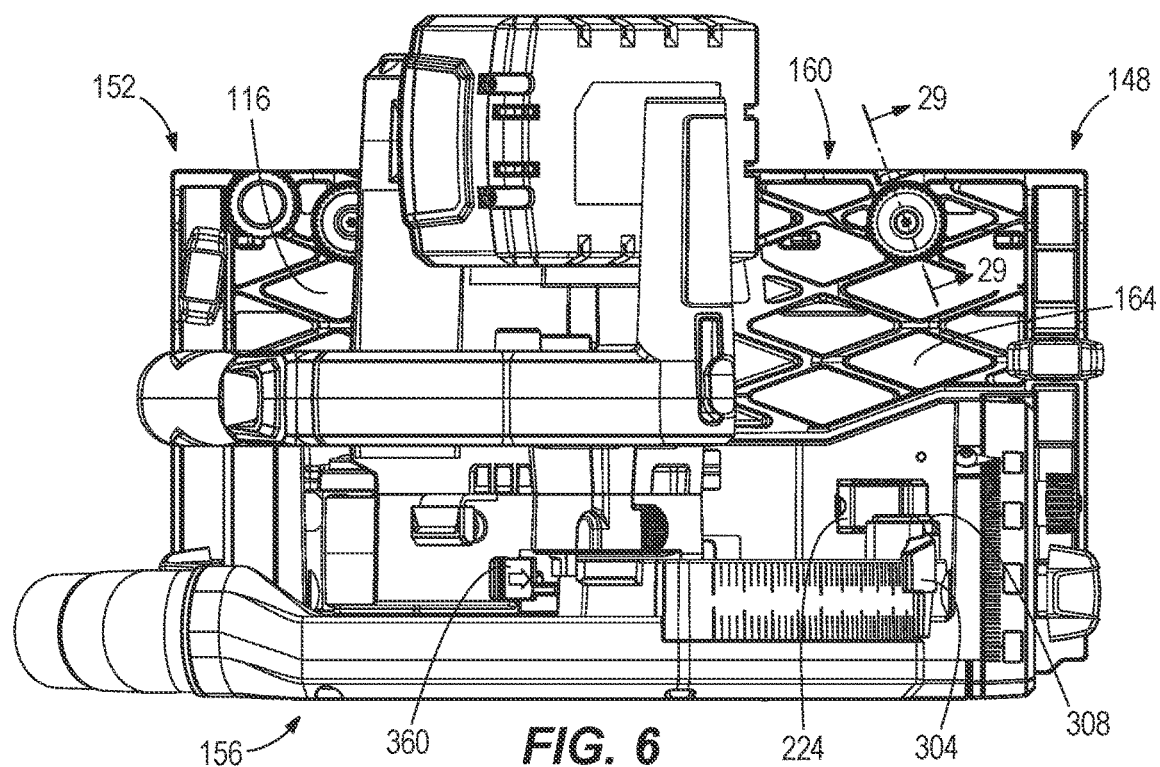
FIG. 6 is a top view of the track saw of FIG. 1.
Figure 7:
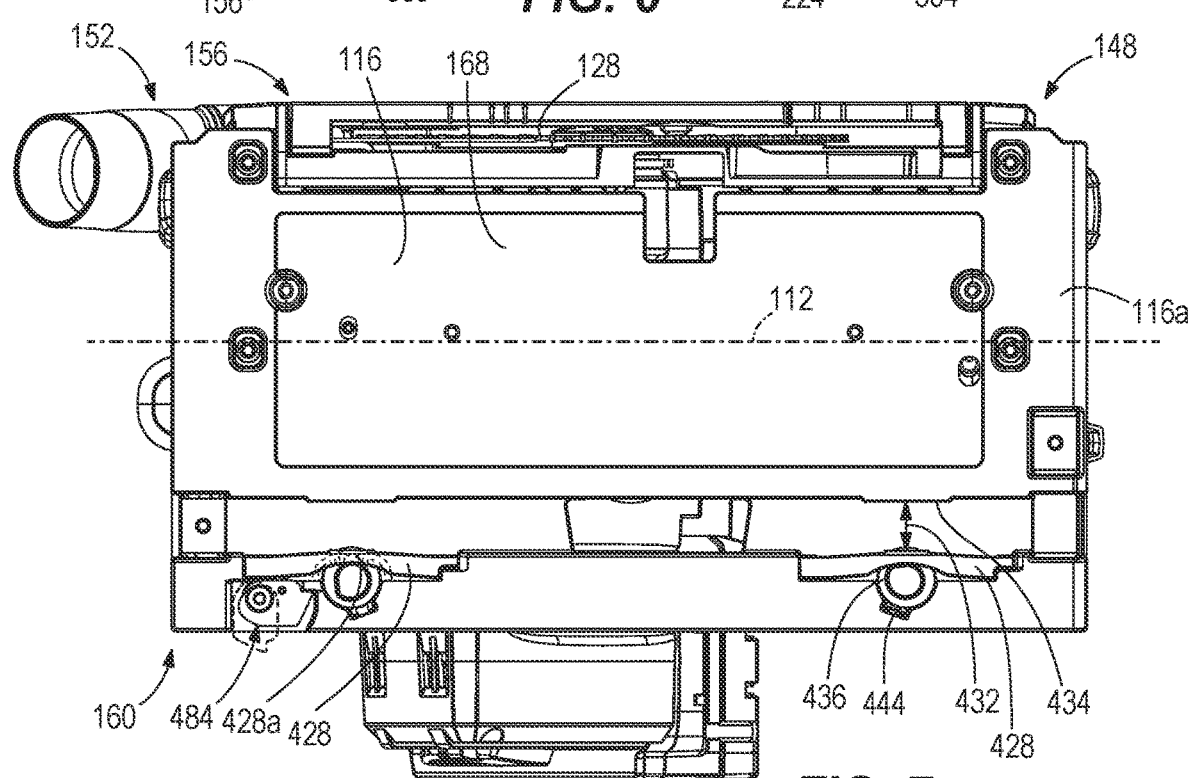
FIG. 7 is a bottom view of the track saw of FIG. 1.

FIGS. 6 and 7 illustrate the ends of the shoe 116. The shoe 116 includes a front end 148, a rear end 152, a first side 156, and a second side 160. The shoe 116 includes an upper surface 164 and an opposite lower surface 168 which is slidable along the track 104. The lower surface 168 of the shoe 116 defines the shoe plane 140.

Figure 3:
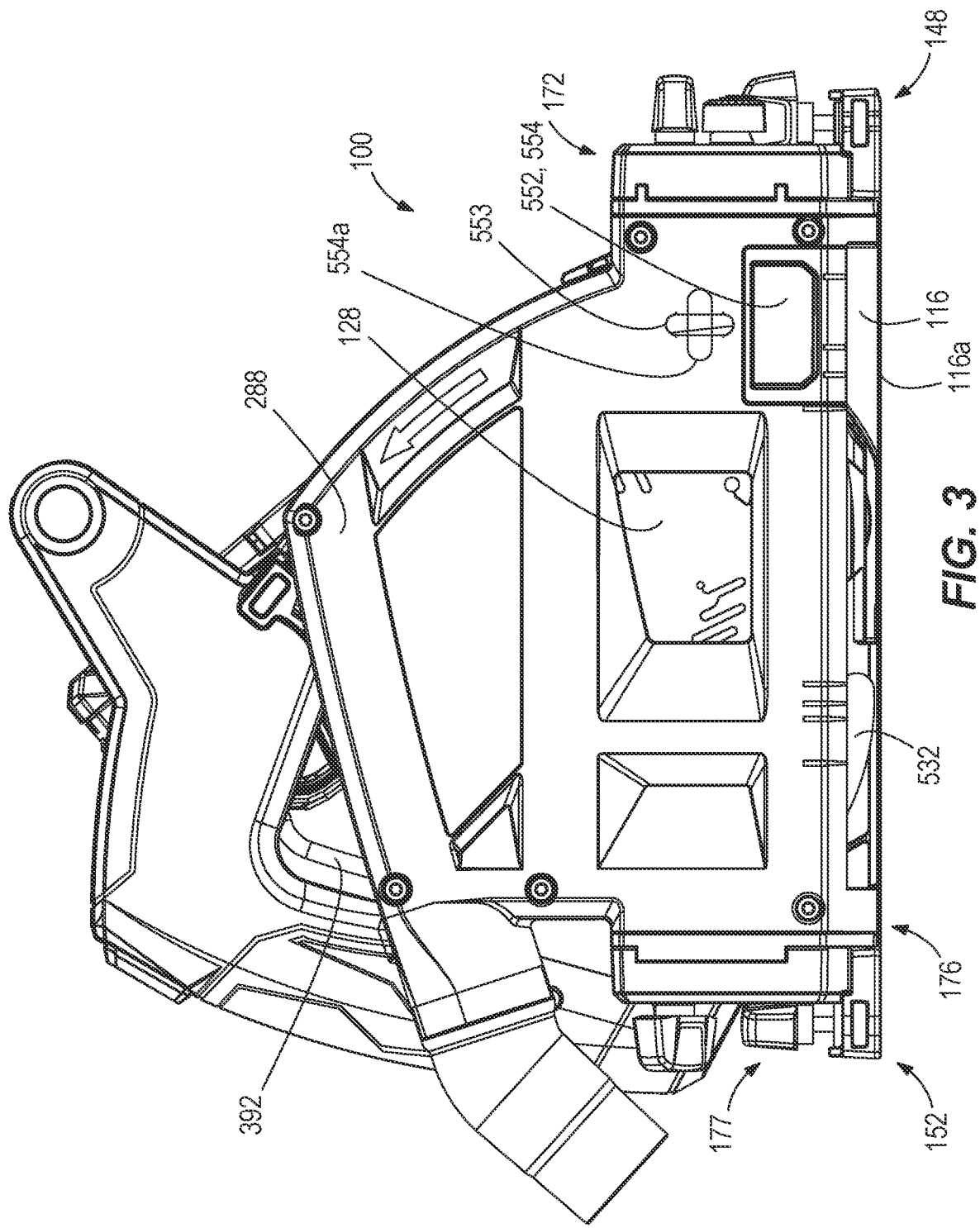
FIG. 3 is a second side view of the track saw of FIG. 1.
Figure 8:
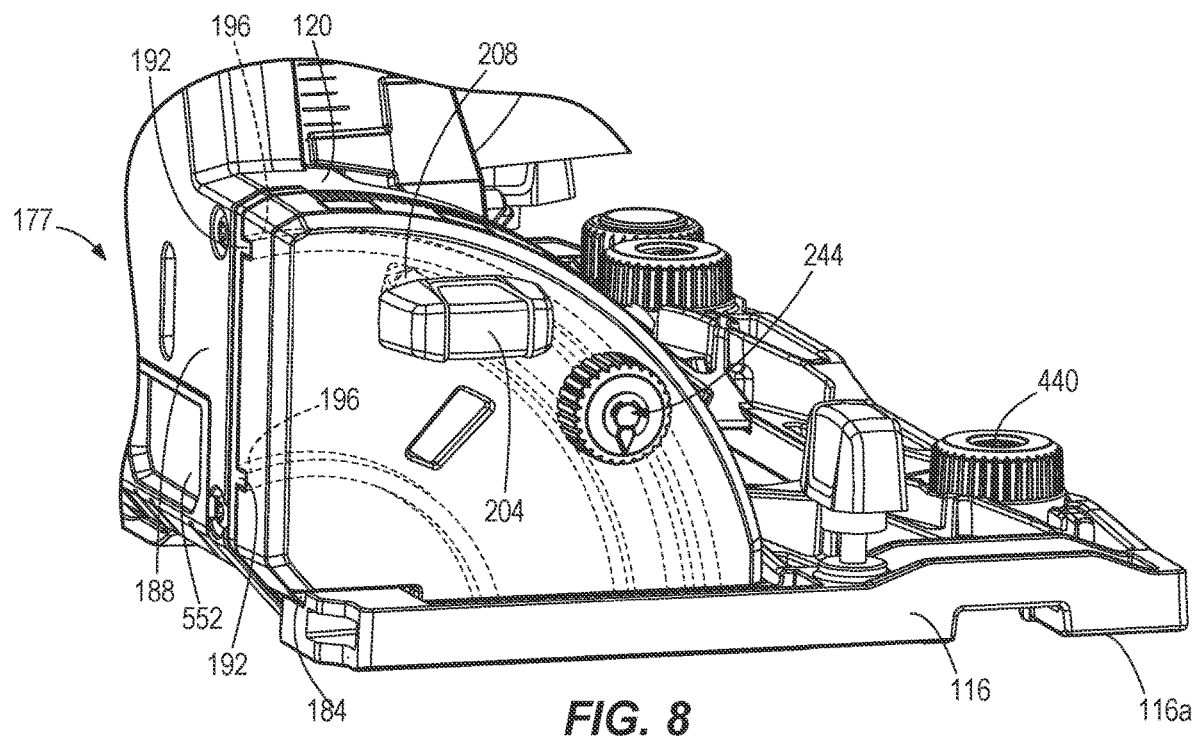
FIG. 8 is a partial perspective view of the track saw of FIG. 1.
Figure 9:
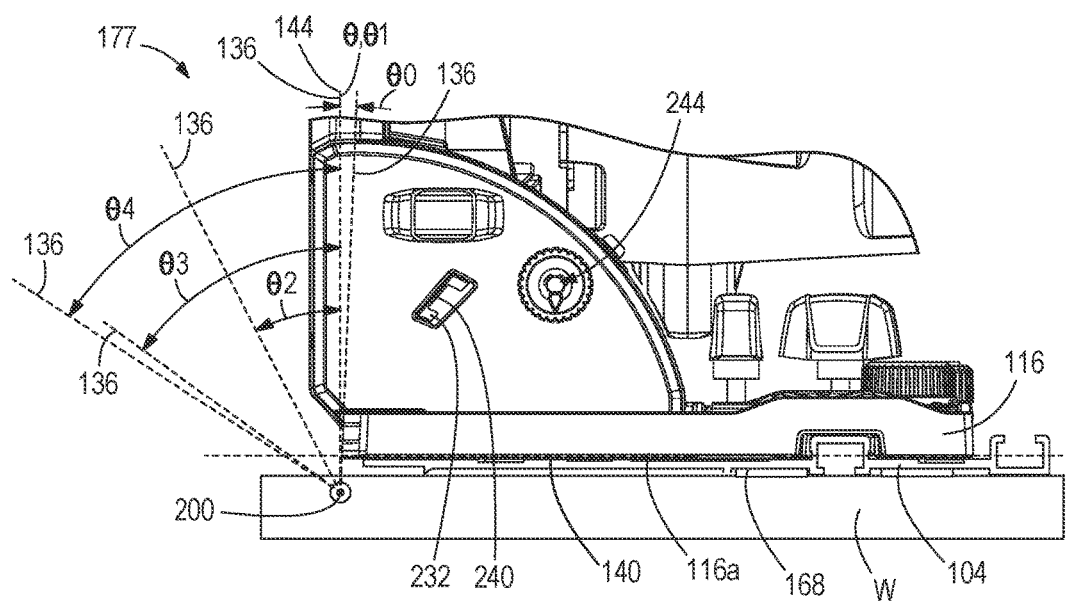
FIG. 9 is a partial front view of the track saw of FIG. 1.
Figure 10:
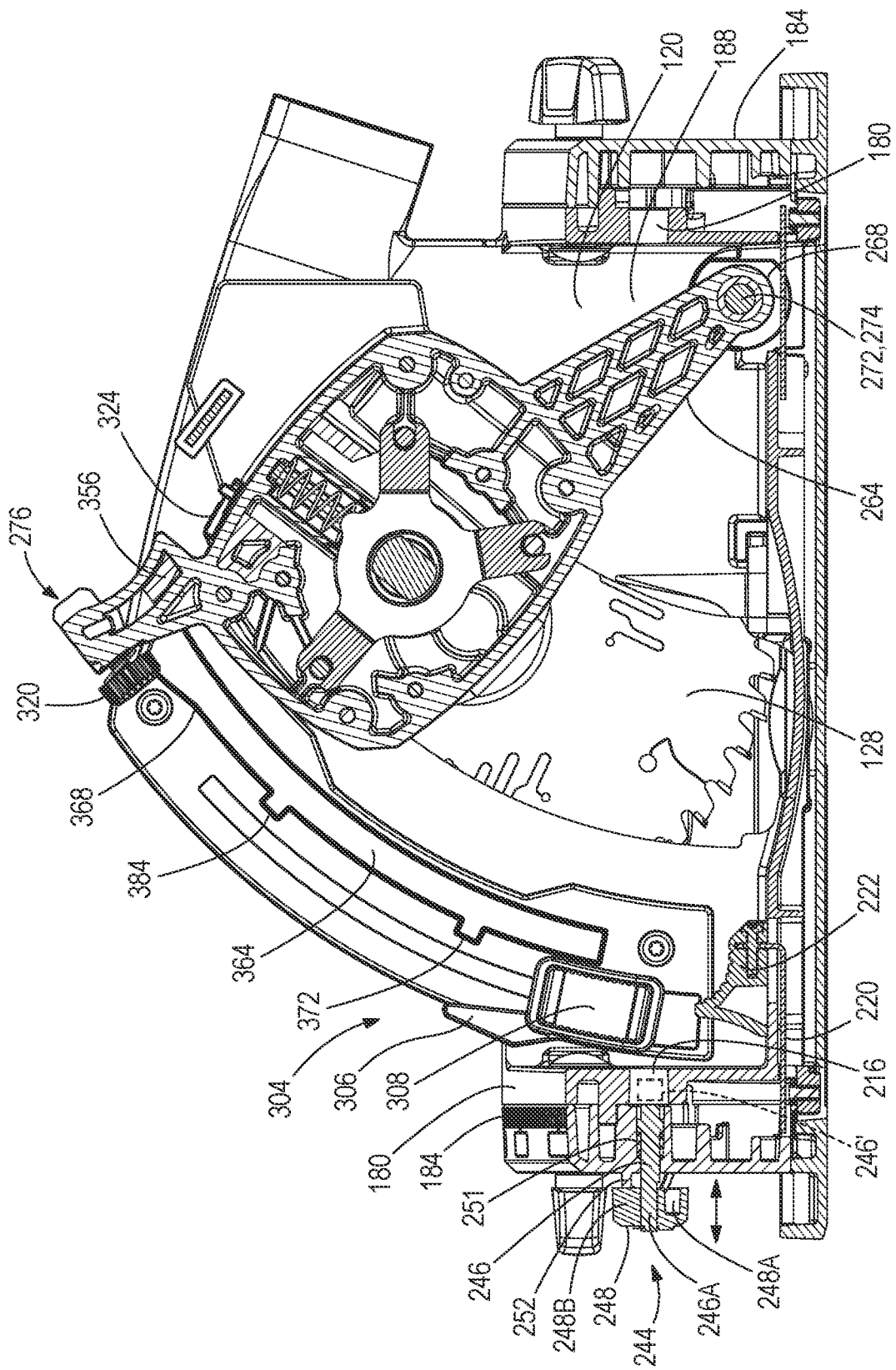
FIG. 10 is a section view of the track saw taken along section line 10-10 in FIG. 4.

Referring to FIG. 3, the track saw 100 includes a front bevel hinge 172 proximate the front end 148 of the shoe 116 and a similar rear bevel hinge 176 proximate the rear end 152 of the shoe 116. FIGS. 8-9 illustrate the connection between the carriage 120 and the shoe 116. Each of the bevel hinges 172, 176 combine to form a bevel angle adjustment mechanism 177. The bevel angle adjustment mechanism is operable to adjust a bevel angle θ between the blade plane 136 and the shoe plane 140. However, as shown in FIG. 9, the bevel angle θ is measured from the vertical reference plane 144, with a bevel angle θ of 0 degrees coinciding with the vertical reference plane 144. Each of the bevel hinges 172, 176 include a carriage plate 180, which is a portion of the carriage 120, and a shoe plate 184, which is fixed to the shoe 116. The carriage plates 180 and shoe plates 184 are illustrated in FIGS. 10-14. The shoe plates 184 extend perpendicularly upward from the upper surface 164 of the shoe 116 in a plane perpendicular to the longitudinal axis 112 of the track 104. Similarly, as shown in FIG. 10, the carriage plates 180 extend perpendicularly from a body 188 of the carriage 120 in a plane perpendicular to the longitudinal axis 112 of the track 104.

As illustrated in FIGS. 11-14, each of the carriage plates 180 includes at least one parallel arc slide 192 (i.e., a key) that engage at least one corresponding raceway 196 (i.e., a keyway) defined in the shoe plates 184. The engagement between the arc slide 192 and the raceway 196 is also illustrated in FIG. 8. Engagement between the parallel arc slides 192 and the arcuate raceways 196 of each bevel hinge 172, 176 permit rotation and adjustment of the bevel angle θ. The bevel angle θ is illustrated in FIG. 9. In the illustrated embodiment, bevel angle θ is defined as an angle extending between the blade plane 136 and the vertical reference plane 144. A bevel angle θ of 0 degrees, θ1 in FIG. 9, corresponds with a blade plane 136 aligned with the plane 144. As illustrated in FIG. 11, the arc slides 192 of the rear hinge 176 are coupled to each other at one actuate end.

As illustrated in FIG. 9, the parallel arc slides 192 and arcuate raceways 196 are centrally positioned along a bevel axis 200 of the track saw 100. The bevel axis 200 extends parallel to the longitudinal axis 112 and is located exterior of the track 104. The bevel axis 200 is illustrated in at least FIGS. 1 and 9. The parallel arc slides 192 function as a guide to slidably engage the raceways 196 of the shoe plate 184 to adjust the bevel angle θ. In the illustrated embodiment, the bevel hinges 172, 176 permit pivoting of the carriage 120, and thus the blade 128 and the blade plane 136 about the bevel axis 200, between a first range of bevel angles θ1-θ3. In the illustrated embodiment, the first range of bevel angles θ1-θ3 is bounded by a lower bound θ1 of 0 degrees and is bounded by an upper bound θ3 of 45 degrees. Other such bounds are possible.

Figure 22:
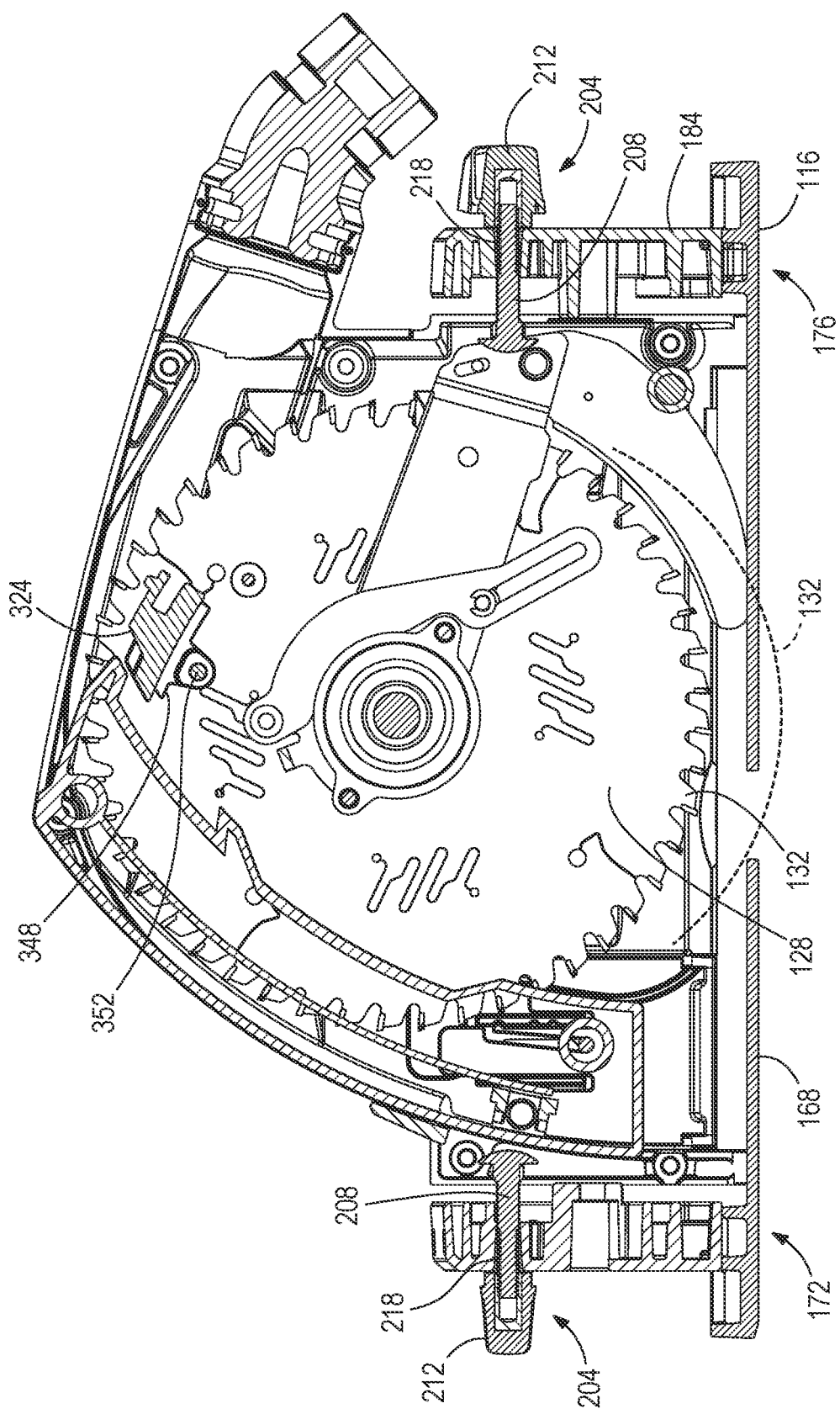
FIG. 22 is a section view of the track saw taken along section line 22-22 in FIG. 4 with some components of the track saw hidden.

As illustrated in FIGS. 8 and 22, bevel locks 204 are provided at the front bevel hinge 172 and the rear bevel hinge 176. The bevel locks 204 are operable to secure and release the carriage 120 relative to the shoe 116 at a desired bevel angle θ. In other embodiments, the bevel lock 204 may be provided at only one of the front bevel hinge 172 and the rear bevel hinge 176. In the illustrated embodiment, shown best in FIG. 22, the bevel lock 204 includes a threaded fastener 208 affixed to the shoe plate 184. More specifically, the fastener 208 extends through a hole 218 in the shoe plate 184 and an arcuate slot 216 (see FIGS. 11 and 12) in the carriage plate 180. The bevel lock 204 also includes a knob 212 threaded to the fastener 208 that can be tightened to apply a clamping force between the plates 180, 184 to secure the carriage 120 relative to the shoe 116. Once the carriage 120 is secured to the shoe 116 via the bevel locks 204, the bevel angle θ is fixed, and the track saw 100 can be translated along the track 104 to make the desired cut in the work piece W.

Figure 15:
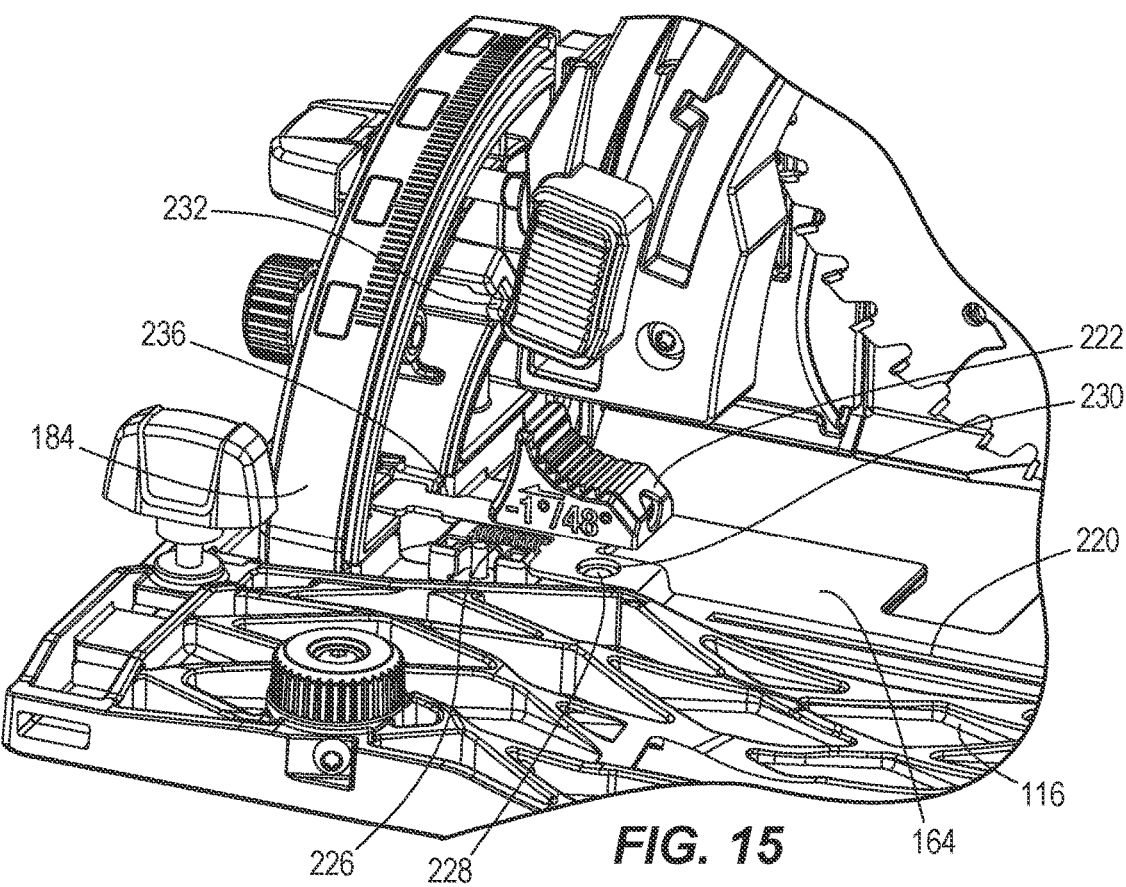
FIG. 15 is a partial perspective view of a linkage and the front bevel hinge with some components of the track saw hidden.
Figure 16:
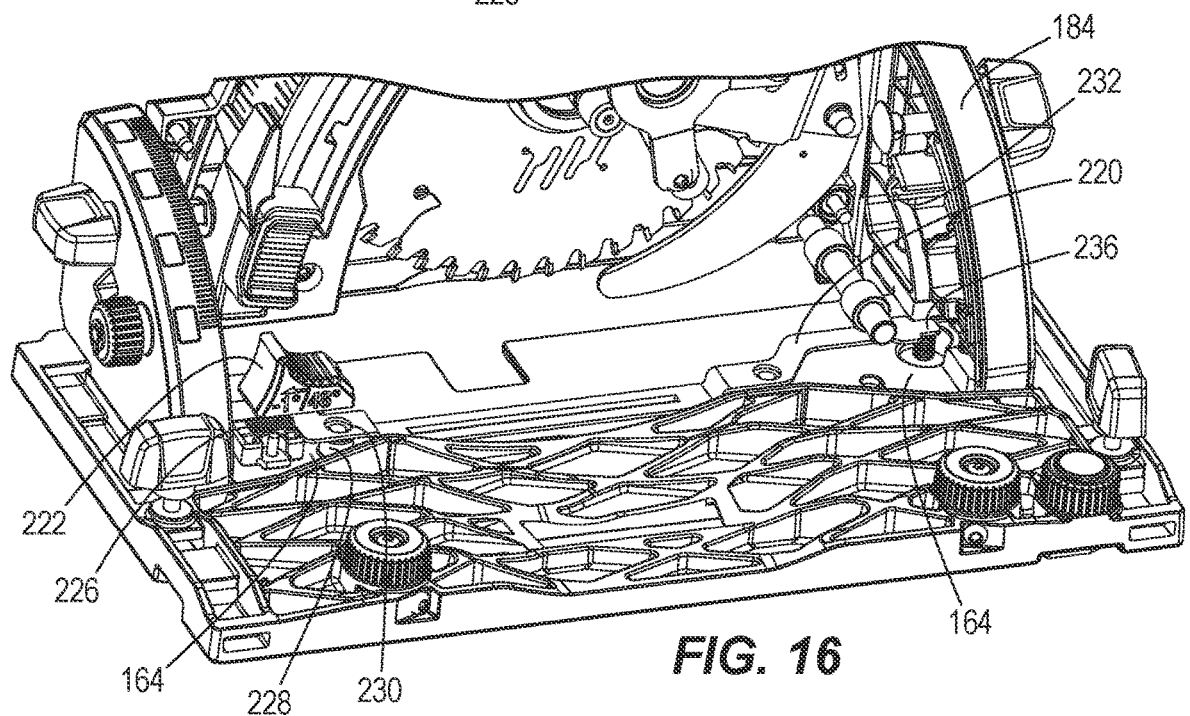
FIG. 16 is a partial perspective view of the linkage and the rear bevel hinge with some components of the track saw hidden.
Figure 19:
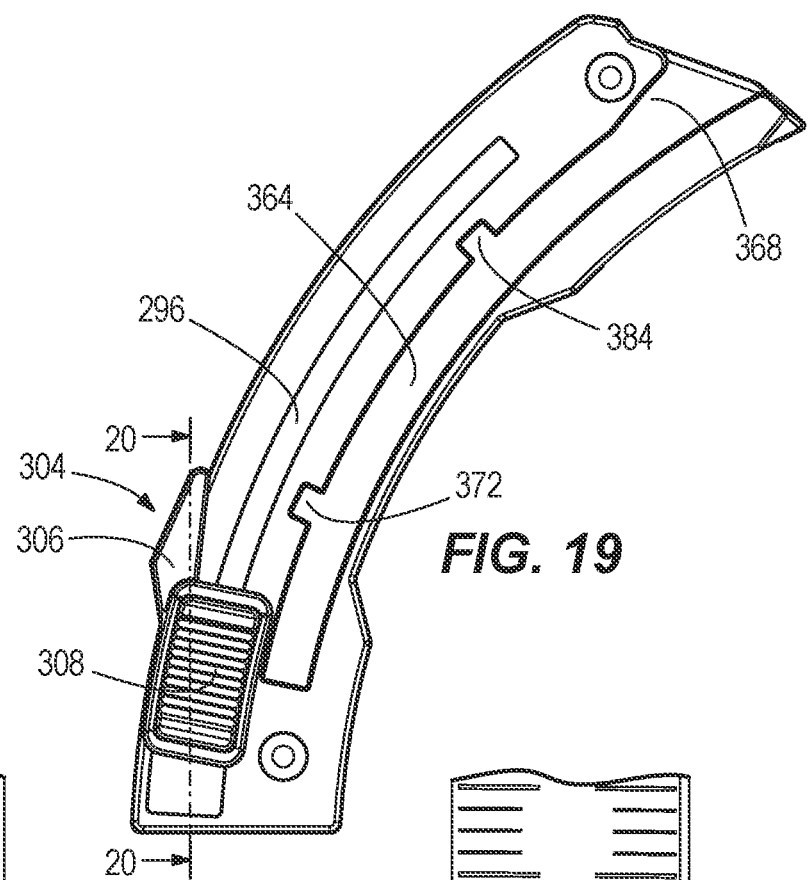
FIG. 19 is a first side view of a depth scale and a depth stop.

A bevel angle stop 220 is provided within the track saw 100 to allow adjustment of the bevel angle θ within a first bevel angle range, θ1-θ3, and within a second bevel angle range θ0-θ4. In the illustrated embodiment, the bevel angle stop 220 is configured as a linkage 220 and is illustrated in detail in FIGS. 15-18. In the illustrated embodiment, the linkage 220 is located between the carriage 120 and the shoe 116. The linkage 220 is slidably supported upon the carriage 120 such that the linkage 220 pivots with the carriage 120 when the bevel angle θ is adjusted. A user may adjust the position of the linkage 220 through a knob 222 (illustrated in FIGS. 15 and 16). The linkage 220 engages a spring 226, which biases the linkage 220 forward to make the saw 100 operable within the first bevel angle range θ1-θ3. In either position of the linkage 220, as previously described, the bevel locks 204 secure and release the carriage 120 relative to the shoe 116 at the desired bevel angle θ within the particular range of bevel angles set by the stop 220.

When the linkage 220 is in a first position (FIG. 18), the linkage 220 restricts the bevel angle θ to the first bevel angle range θ1-θ3. In the illustrated embodiment, the range of bevel angles θ1-θ3 includes and extends between 0 and 45 degrees. Other such ranges are possible. In the illustrated embodiment, set screws are used to restrict the bevel angle θ within the bounds θ1, θ3 of the bevel angle range θ1-θ3. The set screws are positioned, respectively, at the front of the shoe 116 and at the rear of the shoe 116. The set screws can be calibrated within the shoe 116 to ensure the accuracy of the bevel angle bounds θ1, θ3 (i.e., 0 degrees and 45 degrees), which are commonly used bevel angles. With the linkage 220 in the first position and the saw 100 adjusted to the lower bound (θ1) of the first bevel angle range θ1-θ3 (not shown), the linkage 220 rests upon pegs 228 (FIGS. 15 and 16) that extend upwardly from the shoe 116.

When the linkage 220 is in a second, bypass position (FIG. 16), the linkage 220 restricts adjustment of the bevel angle θ to within the second bevel angle range θ0-θ4. In the illustrated embodiment, the second bevel angle range θ0-θ4 includes and extends between −1 and 48 degrees. Other such ranges are possible. With the linkage 220 in the second or bypass position, and the saw 100 adjusted to the lower bound (θ0) of the second bevel angle range θ0-θ4 (FIG. 16), holes 230 in the linkage 220 are aligned with the respective pegs 228, which have a frusto-conical shape with an upper end that is partially received within the holes 230. As such, the saw blade 128 can pivot to a bevel angle θ of −1 degree (i.e., 1 degree in a clockwise direction from the plane 144; FIG. 9)

The linkage 220 is operable to change the upper bound of the bevel angle range. Stop members 232A, 232B are located on each shoe plate 184. The stop members 232A, 232B extend in a direction between the front end 148 and the rear end 152 of the shoe 116. The linkage 220 has ends 236A, 236B that are shaped in correspondence with recesses 240A, 240B of stop members 232A, 232B. Each of the stop members 232A, 232B includes a recess 240A, 240B. In this manner, when the ends 236A, 236B are aligned with the corresponding recesses 240A, 240B, pivoting movement from bevel angle θ3 (45 degrees) to bevel angle θ4 (48 degrees) is permitted. When the ends 236A, 236B are misaligned with the recesses 240A, 240B, pivoting movement is limited to the bevel angle θ3. FIG. 17 illustrates the linkage 220 in the second, bypass position. In this position, the ends 236A, 236B are received in the recesses 240A, 240B, and pivoting movement from bevel angle θ3 to bevel angle θ4 is permitted. FIG. 18 illustrates the linkage in the first position. In this configuration, the ends 236A, 236B abut the stop members 232A, 232B. As such, pivoting movement is only permitted up to bevel angle θ3.

With reference to FIGS. 8-10, an intermediate bevel stop 244 provides a discrete stop for positioning the blade plane 136 relative to the vertical reference plane 144 at an intermediate bevel angle θ2 between the lower bound θ0, θ1 and the upper bound θ3, θ4. In the illustrated embodiment, the intermediate bevel angle θ2 is 22.5 degrees. The intermediate bevel angle θ2 may correspond with common cuts a user may make in the workpiece W. Other intermediate bevel angles θ2 are possible, such as, without limitation, 12.5 degrees and 30 degrees. Further, multiple intermediate bevel stops 244 may be provided on a single track saw 100. In the illustrated embodiment shown in FIG. 10, the intermediate bevel stop 244 includes a shaft 246 extending through a corresponding hole in the shoe plate 184, a knob 248 attached to an outer end 246A of the shaft 246, and a compression spring 251 biasing the shaft 246 toward the rear of the saw 100 (FIG. 10). The knob 248 includes a recessed portion 248A and a generally planar body portion 248B. The recessed portion 248A defines a recess within the knob 248. As illustrated in FIG. 10, the recess 248A extends in a direction away from the shoe plate 184. With continued reference to FIG. 10, the body portion 248B defines a bound of the knob 248 closest to the shoe plate 184. The recessed portion 248A is recessed from the body portion 248B. Accordingly, the body portion 248B defines a surface on the knob 248 upon which a protrusion 252 may abut the knob 248. The protrusion 252 is a raised profile of the shoe plate 184 extending generally parallel to the longitudinal axis 112 from the remainder of the shoe plate 184. The knob 248 may have inclined surfaces (not shown) between the recessed portion 248A and the body portion 248B to promote actuation of the knob 248 between positions. The recessed portion 248A and the body portion 248B are on opposite radial sides of the knob 248 from each other. As illustrated in FIG. 10, the body portion 248B may abut the protrusion 252 to hold the shaft 246 in a retracted position separated from the carriage plate 180. In another position, the knob 248 is rotated such that the recessed portion 248A receives the protrusion 252, and the shaft 246 is positioned at least partially within the carriage plate 180.

The intermediate bevel stop 244 can be actuated from user input received by the knob 248 to adjust the position of the intermediate bevel stop 244 between an engaged position (illustrated with the shaft 246 extending to an engaged shaft position 246' in FIG. 10) and a disengaged position (illustrated with the shaft 246 in FIG. 10). The spring 251 biases the intermediate bevel stop 244 towards the engaged position.

In the engaged position (illustrated with the shaft 246 extending to the engaged shaft position 246' in FIG. 10), the protrusion 252 of the shoe plate 184 is received within the recessed portion 248A of the knob 248. The shaft 246 is located in an engaged shaft position 246' located at least partially within the arcuate slot 216 of the carriage plate 180. With the shaft 246' within the slot 216, the carriage 120 is rotated about the bevel axis 200 to the intermediate bevel angle θ2. At the intermediate bevel angle θ2, the shaft 246, while in the engaged shaft position 246' (FIG. 10), abuts against a set screw. The set screw can be adjusted to ensure that the location of the intermediate bevel angle θ2 is highly accurate during use. Other alternative embodiments may otherwise provide a step such that the shaft 246, while in the engaged shaft position 246' is accurately located at the intermediate bevel angle θ2. One such alternate embodiment may utilize an end face 256 of the slot 216 (FIGS. 11 and 12). At this point, the bevel locks 204 can be tightened to secure the carriage 120 to the shoe 116 at the intermediate bevel angle θ2. When moving from the disengaged position to the engaged position, the user must rotate the knob 248 (e.g., by 180 degrees) such that the recessed portion 248A of the knob 248 aligns with the protrusion 252 of the shoe plate 184. Upon this alignment, with aid from the inclined surfaces (not shown), the spring 251 will bias the shaft 246 towards the engaged shaft position 246'.

With the intermediate bevel stop 244 in the disengaged position (illustrated with the shaft 246 in FIG. 10), the protrusion 252 of the shoe plate 184 abuts the in-line portion 248B of the knob 248. This retains the intermediate bevel stop 244 in a retracted position from the slot 216. As a result, the carriage 120 is free to rotate about the bevel axis 200 without obstruction from the intermediate bevel stop 244 between the lower bound θ0, θ1 and the upper bound θ3, θ4. When moving the intermediate bevel stop 244 from the engaged position to the disengaged position, the user must rotate the knob 248 (e.g., by 180 degrees) against the force of the spring 251. By rotating the knob 248 in this direction, the inclined surfaces on the underside of the knob 248 slide along the protrusion 252.

Figure 2:
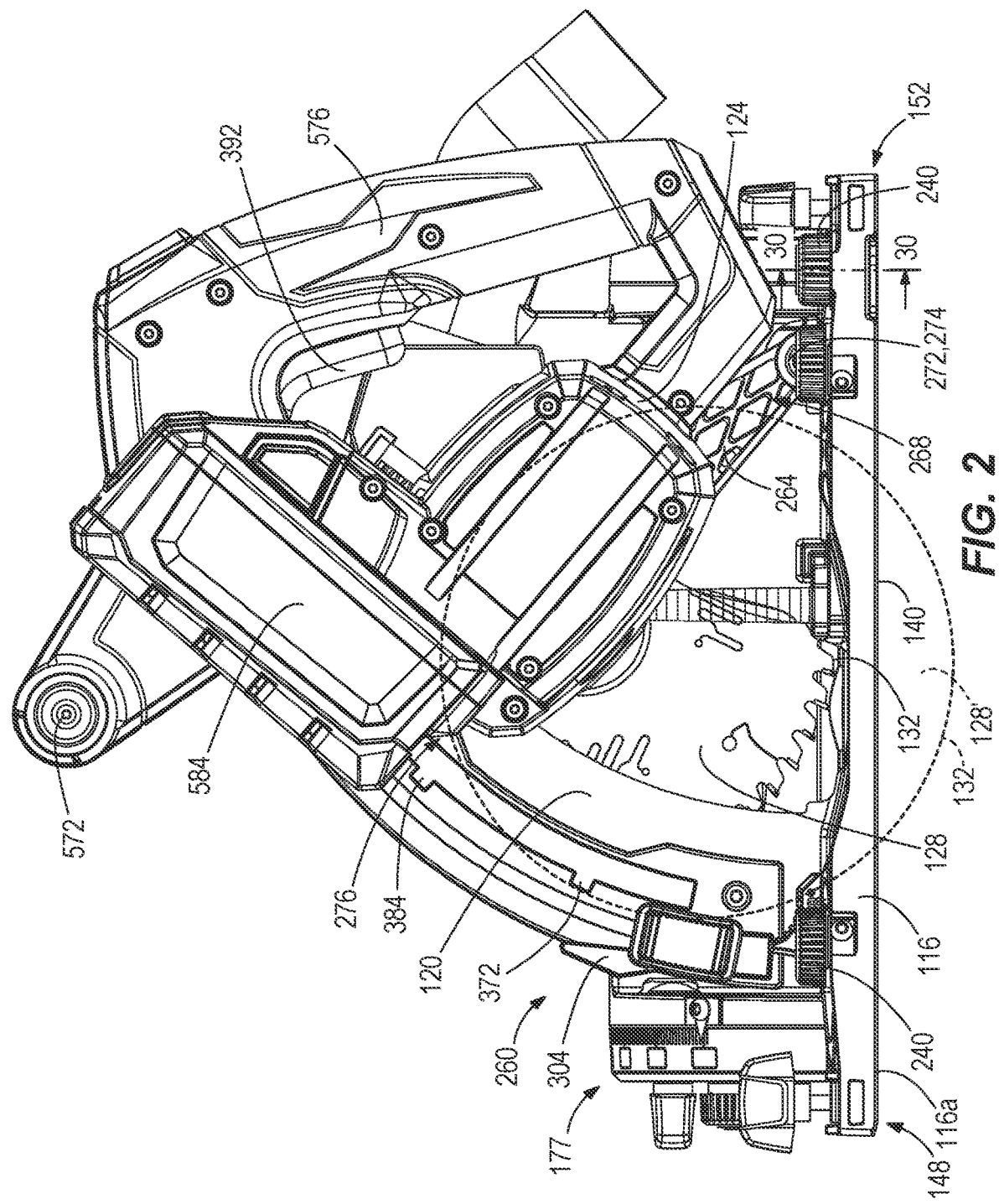
FIG. 2 is a first side view of the track saw of FIG. 1.

As illustrated in at least FIG. 2, the track saw 100 further includes a plunge depth assembly 260 permitting movement of the blade 128 between a non-plunged or retracted position (FIG. 2) in which the lowermost portion 132 of the blade 128 does not intersect the shoe plane 140 and a plunged or extended position (illustrated with blade 128' in FIG. 2) in which the blade 128 intersects the shoe plane 140 for cutting the work piece W. The plunge depth assembly 260 includes a lever arm 264 (FIG. 10) pivotably coupled at a first end 268 to the shoe 116 by a pivot hinge 272. The pivot hinge 272 defines a plunge axis 274 about which the lever arm 264 is rotated. The plunge axis 274 is also illustrated in FIG. 1. The plunge axis 274 is transverse the longitudinal axis 112 of the track 104. More specifically, the plunge axis 274 is perpendicular to the longitudinal axis 112 of the track 104 and extends between the first side 156 and the second side 160 of the shoe 116. Returning to FIG. 10, the lever arm 264 includes a second end 276 opposite the first end 268. Additionally, a compression spring 280 (FIG. 1) extends between the lever arm 264 and the shoe 116 to bias the lever arm 264 towards the retracted position.

The track saw 100 further includes a primary handle 572 and an auxiliary handle 576 (FIGS. 1 and 2). The primary handle 572 extends generally from the first side 156 of the shoe 116 towards the second side 160 of the shoe 116. The auxiliary handle 576 extends generally from the front end 148 of the shoe 116 towards the rear end 152 of the shoe 116. As such, when the auxiliary handle 576 is pressed forwards, the track saw 100 is translated along the track 104. And, when the primary handle 572 is pressed downwards, the saw unit 124 is plunged downward relative to the shoe 116. However, operation of either handle 572, 576 can translate the track saw 100 along the track 104. Additionally, operation of either handle 572, 576 can plunge the saw unit 124 relative to the shoe 116.

Figure 20:
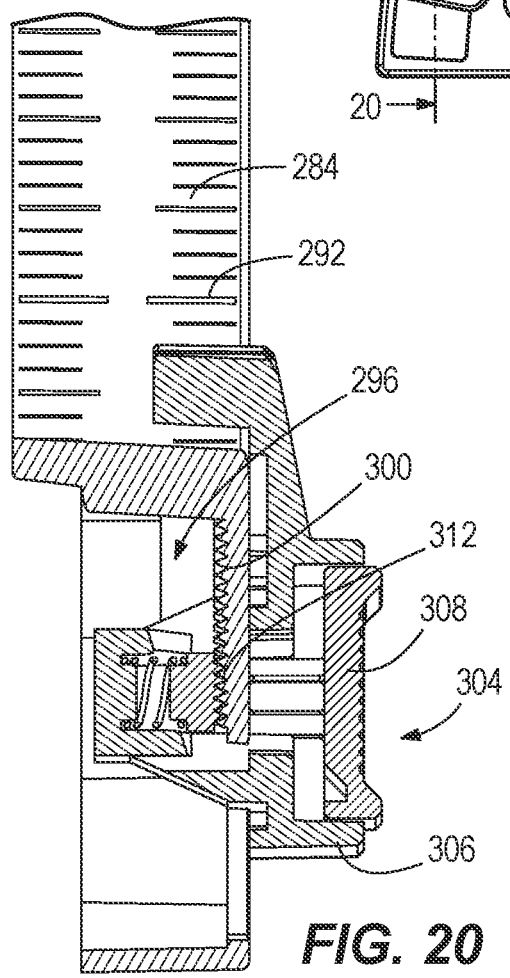
FIG. 20 is a section view of the depth scale and the depth stop taken along section line 20-20 in FIG. 19 and having the depth stop in the engaged position.
Figure 21:
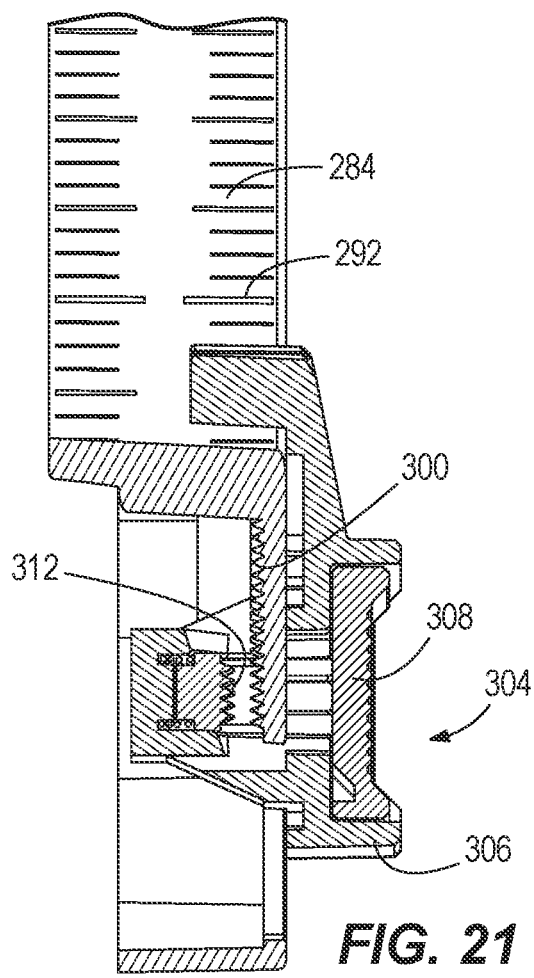
FIG. 21 is a section view of the depth scale and the depth stop taken along section line 20-20 in FIG. 19 and having the depth stop in the disengaged position.

The plunge depth assembly 260 further includes a depth scale 284 (FIG. 1) fixed to the carriage 120 adjacent an upper blade guard 288, which partially encloses the saw blade 128. The depth scale 284 includes indicia 292 for indicating the depth to which the saw blade 128 is plunged beneath the shoe plane 140. With reference to FIG. 20, the depth scale 284 includes an arcuate guide slot 296 and mating teeth 300. A depth stop 304 includes a stop body 306 and a stop button 308. The stop body 306 is slidable along the arcuate guide slot 296 of the depth scale 284 to different positions coinciding with different plunge depths of the blade 128. The stop button 308 is carried on the stop body 306 and is movable between a locked position, in which the stop body 306 is locked to the depth scale 284, and a release position, in which the stop body 306 is repositionable along the depth scale 284. As shown in FIG. 20, the stop button 308 includes mating teeth 312 which optionally engage the mating teeth 300 of the depth scale 284. FIG. 21 illustrates the mating teeth 312 in a disengaged position from the mating teeth 300. The depth stop 304 also includes a compression spring 316 that biases the mating teeth 312 to engage the mating teeth 300 as shown in FIG. 20.

As illustrated in FIG. 10, once the depth stop 304 is in the desired location, a user rotates the lever arm 264 about the pivot hinge 272 such that the second end 276 of the lever arm 264 abuts the depth stop 304. Optionally, the second end 276 of the lever arm 264 is provided with a thumb screw 320 extending between the second end 276 of the lever arm 264 and the depth stop 304 to provide further adjustability of the depth of the blade 128 during a cutting operation.

The track saw 100 also includes a scoring slider 324 (FIG. 23), which provides an intermediate stop for the plunge depth assembly 260. The scoring slider 324 is movable between three positions that are illustrated in phantom lines as 324A, 324B, and 324C. The scoring slider 324 is moved into and out of alignment with a pocket 328 within the depth scale 284. The pocket 328 has a first end 332 and a second end 336. The first end 332 of the pocket 328 corresponds with the retracted position of the blade 128. The second end 336 of the pocket 328 corresponds with a scoring depth position (e.g., 1-2 mm below the show plane 140 as illustrated in FIG. 22) of the blade 128. The scoring slider 324A, shown in solid lines, is retracted from the pocket 328. Upon translation of the scoring slider 324, the scoring slider 324 is movable to the position illustrated by the scoring slider 324B. The scoring slider 324B, shown in phantom lines, is positioned within the pocket 328 adjacent the first end 332. Upon pivoting of the lever arm 264 and subsequent plunging of the blade 128, the scoring slider 324B is movable to the position shown with the scoring slider 324C. The scoring slider 324C, shown in phantom lines, is positioned within the pocket 328 adjacent the second end 336. With the scoring slider 324 within the pocket 328, the scoring slider 324 can abut the first end 332 to limit the depth of the blade 128 to the scoring depth position. In the illustrated embodiment, the scoring depth position of the blade 128 locates the lowermost portion 132 of the blade 128 1-2 mm below the shoe plane 140.

When the scoring slider 324 is retracted from the pocket 328 (e.g., in the position illustrated by the scoring slider 324A), the lever arm 264 is operable to plunge along the entirety of the depth scale 284, and optionally, up to the depth stop 304 described above. When the scoring slider 324 is extended to a position within the pocket 328 (e.g., in the positions illustrated by the scoring sliders 324B, 324C), the scoring slider 324 the lever arm 264 is limited between the retracted position (in which the blade 128 does not extend below the shoe plane 140) and the scoring depth position, in which the lowermost portion 132 of the blade 128 nominally extends below the shoe plane 140, when the scoring slider 324 abuts the second end 336 of the pocket 328.

Figure 23:
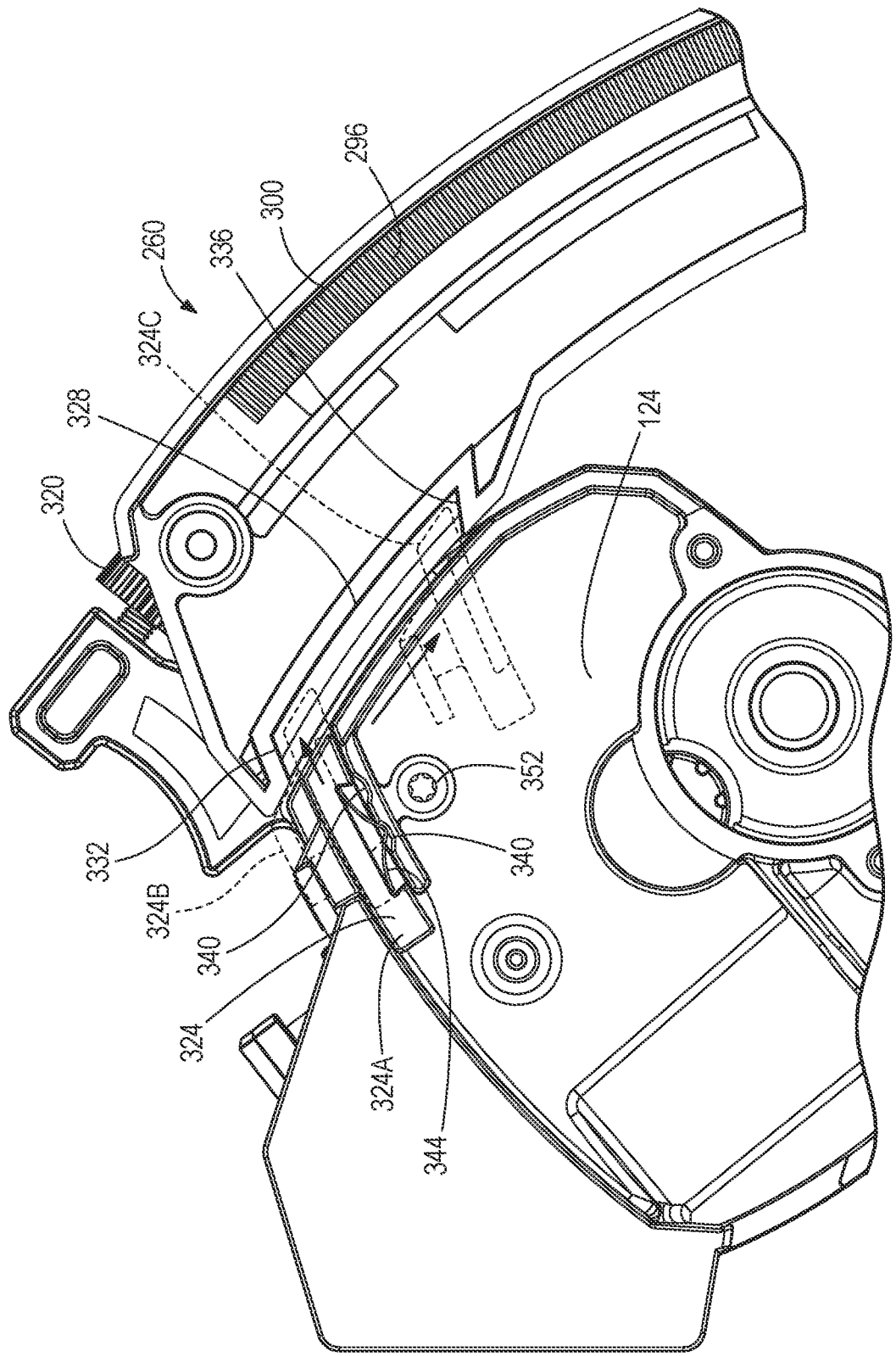
FIG. 23 is a section view of the track saw taken along section line 23-23 in FIG. 4 with some components of the track saw hidden.

With continued reference of FIG. 23, the saw unit 124 includes detents 340 corresponding to each of the extended position (e.g., the scoring sliders 324B and 324C), and the retracted position (e.g., the scoring slider 324A) of the scoring slider 324. A detent spring 344 is configured to engage the detents 340 of the scoring slider 324 to keep the scoring slider 324 in either the engaged position or the disengaged position. The detent spring 344 may be in the form of a leaf spring. In another embodiment, a molded finger (not shown) can replace the detent spring 344. The scoring slider 324 may be protected by a cover 348 as shown in FIG. 22. The cover 348 may be rotatably fixed to the saw unit 124 by a fastener 352. The cover 348 may protect the detent spring 344 and the remainder of the saw unit 124 from ingress of unwanted contaminants. Optionally, the cover 348 may permit access to the scoring slider 324 without rotation about the fastener 352. In other embodiments, the cover 348 may be required to be rotated about the fastener 352 to access the scoring slider 324. In the embodiment including the molded finger (not shown), the molded finger can be applied within the cover 348.

Figure 24:
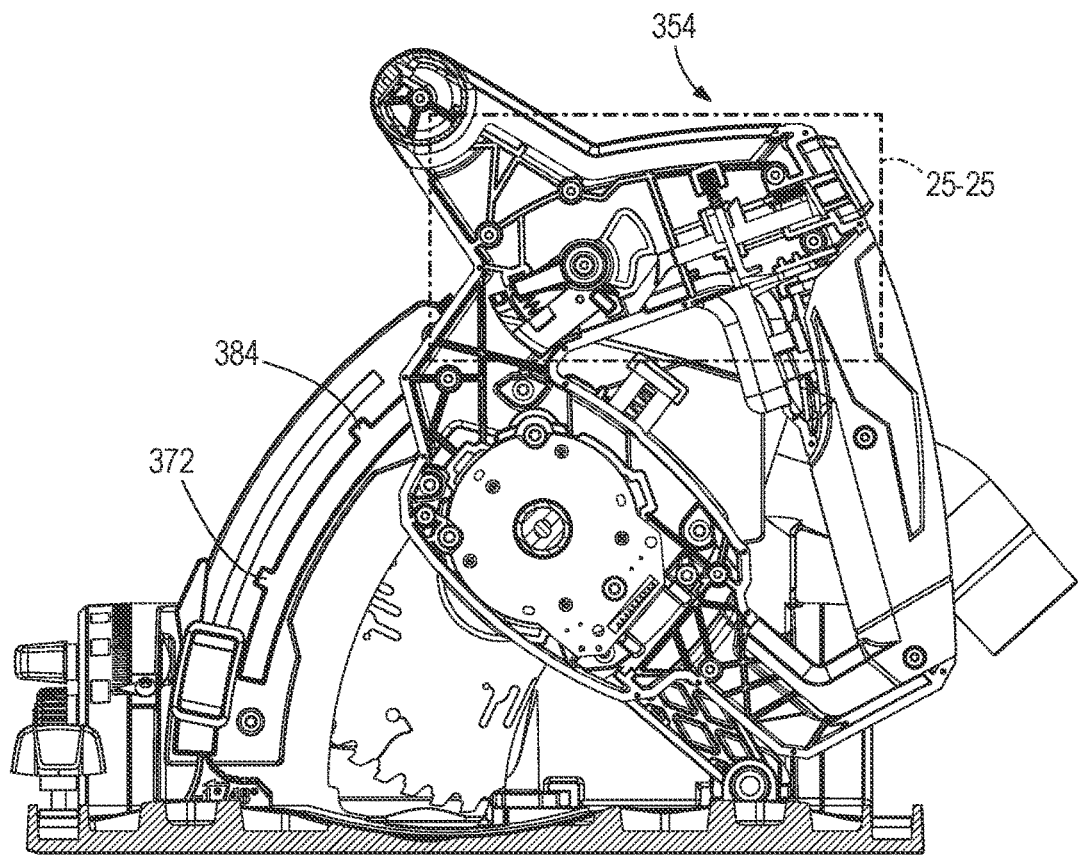
FIG. 24 is a section view of the track saw taken along section line 24-24 in FIG. 4.
Figure 25:
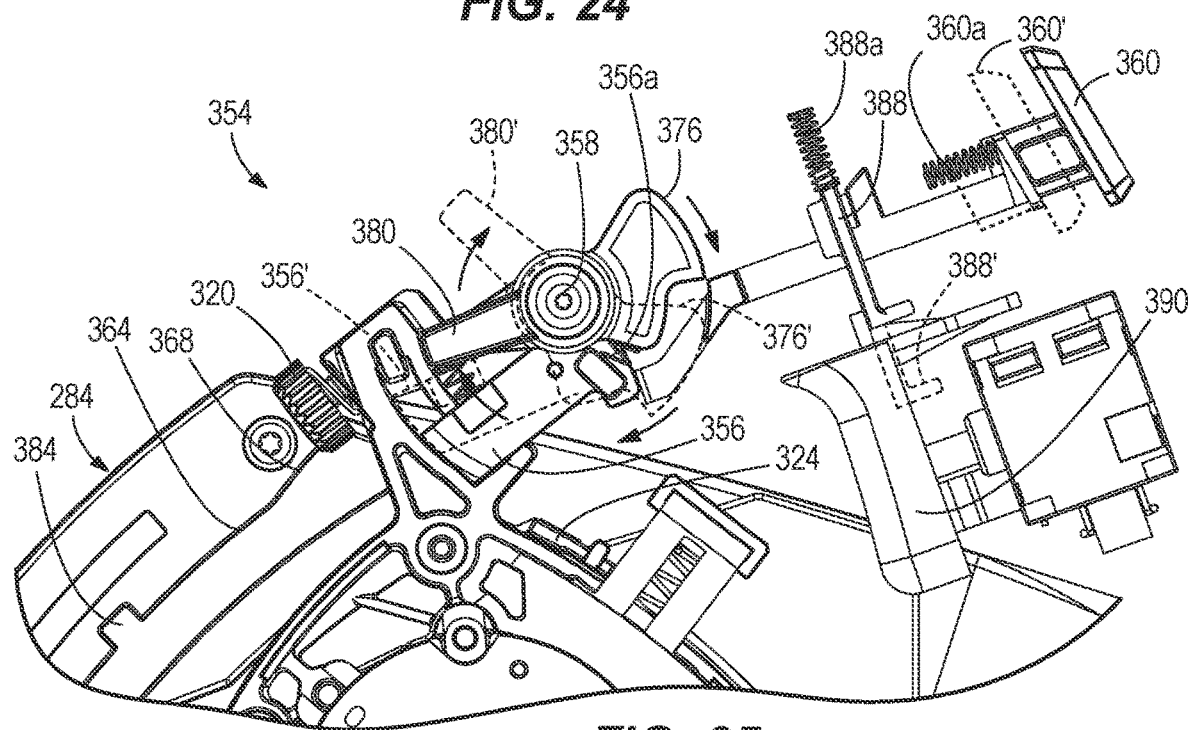
FIG. 25 is an enlarged view taken along section 25-25 in FIG. 24 with some components of the track saw hidden.
Figure 26:
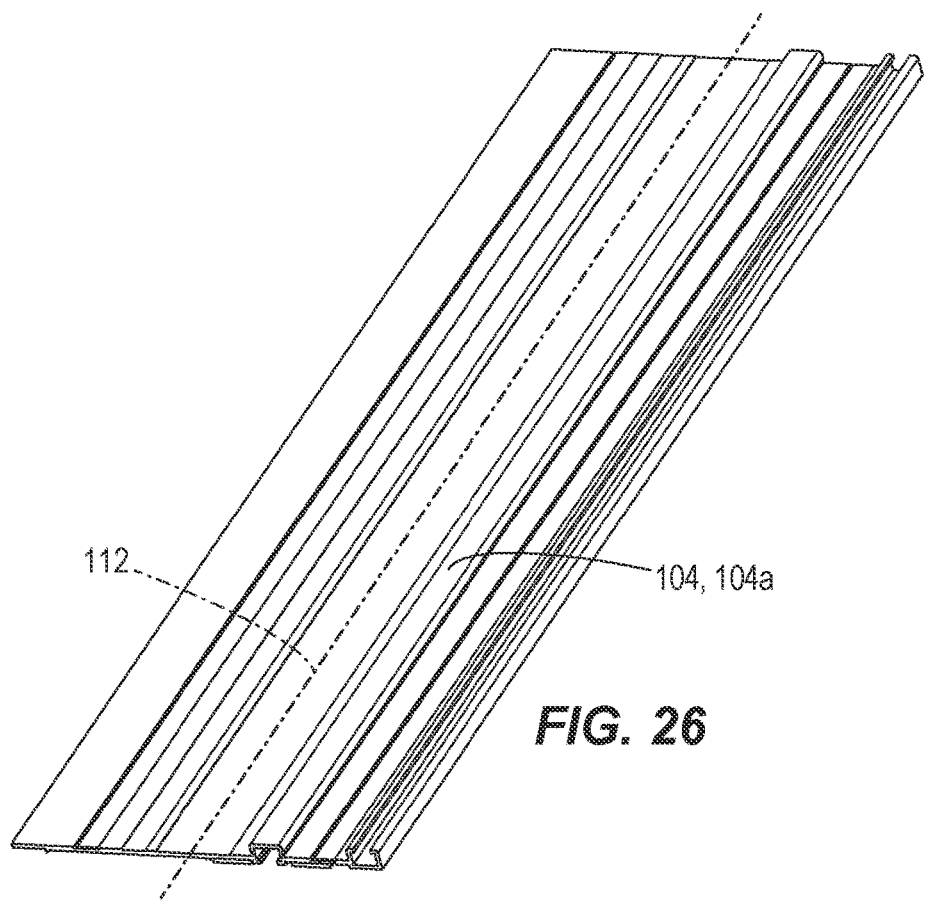
FIG. 26 is a perspective view of the track of FIG. 1.

FIGS. 24 and 25 illustrate a plunge lockout mechanism 354 including a swing latch 356 configured to lock out plunging operation of the lever arm 264. FIG. 25 illustrates the plunge lockout mechanism 254, swing latch 356, and a plunge button 360 (i.e., an actuator) connected to the swing latch 356. FIG. 25 illustrates the plunge button 360 in a released position coinciding with a locked position of the swing latch 356 which inhibits plunging of the saw unit 224. FIG. 25 further illustrates the plunge button 360 in a depressed position (illustrated in dashed lines as a plunge button 360') coinciding with an unlocked position of the swing latch 356 (illustrated in dashed lines as a released swing latch 356') which enables plunging of the saw unit 224. Upon translation of the plunge button 360, the swing latch 356 is rotated about a pivot 358 to enable/disable plunging action of the lever arm 264. Translation of the plunge button 360 involves moving the plunge button 360 from an initial position (e.g., 360) to another position (e.g., 360'), where lines joining initial and final points of each of the points of the plunge button 360 are a set of parallel straight lines of a length. The plunge button 360 is biased toward the released position by a spring 360a.

The plunge lockout mechanism 654 is coupled to the saw unit 124 for movement therewith between a first position and a second position. In the first position (e.g., FIG. 3), the saw blade 128 does not protrude beyond the bottom (i.e., lower) surface 116a of the shoe 116. In the second position (e.g., FIG. 2), the saw blade 128 (as illustrated by the blade 128') protrudes beyond the bottom (i.e., lower) surface 116a of the shoe 116.

Generally speaking, the plunge lockout mechanism 354 relates to the components illustrated in FIG. 25 which serve to selectively inhibit plunging of the saw unit 124. FIG. 25 illustrates the swing latch 356 in a position disabling plunging action of the lever arm 264. In this position, the swing latch 356 is restricted from being passed into a channel 364 of the depth scale 284. The channel 364 is arcuate in geometry, and is generally parallel to the arcuate guide slot 296. FIG. 25 further illustrates the swing latch 356' in phantom lines and in a position enabling plunging action of the lever arm 264. In this position, the swing latch 356' is permitted to enter the channel 364 of the depth scale 284. The channel 364 may include a flared or ramped entrance 368 to promote entrance of the swing latch 356' therethrough when the swing latch 356 is moved to the enabled position (shown with swing latch 356'). As illustrated in FIG. 24, the channel 364 may further include a calibration notch 372 for engaging the swing latch 356 to secure the location of the lever arm 264 during a calibration process of the accuracy of the track saw 100. The calibration notch 372 is used during assembly of the saw.

FIG. 25 also illustrates a blade change cam 376 and a lever 380 of the track saw 100. The lever 380 is located at the exterior of the track saw 100 as illustrated in FIGS. 4 and 5. Returning to FIG. 25, the lever 380 is operable to move the blade change cam 376 between a blade change position (illustrated with blade change cam 376') and an operation position (illustrated with blade change cam 376) in which the saw unit 124 is movable relative to the shoe 116. Upon rotation of the lever 380 to the blade change position (illustrated with the lever 380'), the blade change cam 376' prohibits translation of the plunge button 360.

Further, with continued reference to FIG. 25, absent translation of the plunge button 360, a trigger lockout plate 388 is located in a lockout position (shown at 388' in dotted lines) to disable translation of a trigger 390 of the saw 100. This restricts activating the saw unit 124 and subsequent rotation of the blade 128. Prior to making a cut, a user must depress (i.e., translate) the plunge button 360 to retract the lockout plate 388 to a retracted position illustrated in FIG. 25 (shown at 388 in solid lines). The trigger lockout plate 388 is biased toward the lockout position (shown at 388') by a spring 388a. When the lever 380 is actuated, the swing latch 356 is biased against the channel 364 of the depth scale 284 by a spring 356a (illustrated in at least FIG. 25). With the swing latch 356 biased against the depth scale 284, a user plunges the saw unit 124 until the swing latch 356 reaches a blade change notch 384. The swing latch 356 is snapped into the blade change notch 384 to lock (i.e., inhibit movement of) the plunge depth. This aligns the blade 128 for removal of the blade 128 from the saw 100 in a blade exchange. A detent in the blade change cam 376 holds the blade change cam 376 in the locked position during the blade exchange. Without the detent, the force from the spring biasing the swing latch 356 against the channel 364 would push the blade change cam to the unlocked position. More specifically, the plunge lockout mechanism 354 includes the swing latch 356, the plunge button 360, the blade change cam 376, the lever 380, and the trigger lockout plate 388.

As illustrated in FIG. 25, the spring 356a is configured to bias the swing latch 356 against the channel 364 in response to the blade change cam 376 being moved to the blade changed position (illustrated with the lever 380'). The spring 356a is configured to pivot the latch 380 from the unlocked position (illustrated by the lever 380) and into the blade change notch 384 during movement of the saw unit 224 from a first non-plunged position (FIG. 2 with the blade 128 recessed from the bottom surface 116a) and toward the second position (FIG. 2 with the blade 128' protruding from the bottom surface 116a), thereby holding the saw unit 224 in an intermediate position between the first position and the second position to facilitate exchange of the saw blade 128.

FIG. 27 illustrates the track 104 sitting atop a work piece W. The track 104 has a workpiece side 392 and an opposite tool side 396. The track 104 also includes a circular saw blade-facing edge 400 that is parallel with the axis 112 and that is located adjacent the blade 128 when the track saw 100 is positioned on the track 104. And, the track 104 includes an opposite, distal edge 404 that is also parallel with the axis 112 and that is spaced from the blade 128. The track 104 includes an edge strip 464 adjacent the circular saw blade-facing edge 400 configured to be cut during the first use of the track 104 to ensure zero clearance between the blade 128 of the track saw 100 and the edge strip 464. In the illustrated embodiment, the zero clearance between the saw blade 128 and the edge strip 464 is a nominal zero clearance. In other words, the edge strip 464 is desired and ideally at zero clearance with the saw blade 128. Some variation due to, for example, manufacturing tolerances of the edge strip 464 and/or the saw blade 128, changing of environmental conditions, and forces applied to the edge strip 464 and/or the saw blade 128 may deviate the edge strip 464 the nominal zero clearance with the saw blade 128.

With continued reference to FIG. 27, the track 104 consists of a material having a first coefficient of friction. In the illustrated embodiment, the track 104 comprises a lightweight material resistant to corrosion, such as, without limitation, Aluminum. The track 104 includes a gripping portion 408 positioned on the workpiece side 392 in contact with the work piece W, and in some embodiments, spacing the workpiece side 392 from the work piece W by a small gap. The gripping portion 408 has a second coefficient of friction higher than the first coefficient of friction. As such, the gripping portion 408 can limit unwanted movement (e.g., sliding) of the track 104 relative to the workpiece W. In the illustrated embodiment, the gripping portion 408 consists of a material with a high coefficient of friction, which is also slightly deformable, such as, without limitation, foam or rubber. The track also includes parallel sliding strips 468, 472 on the tool side 396 having a third coefficient of friction less than the first coefficient of friction. As such, the sliding strips 468, 472 reduce friction between the shoe 116 and the track 104 that might otherwise exist in the absence of the strips 468, 472.

Figure 28:
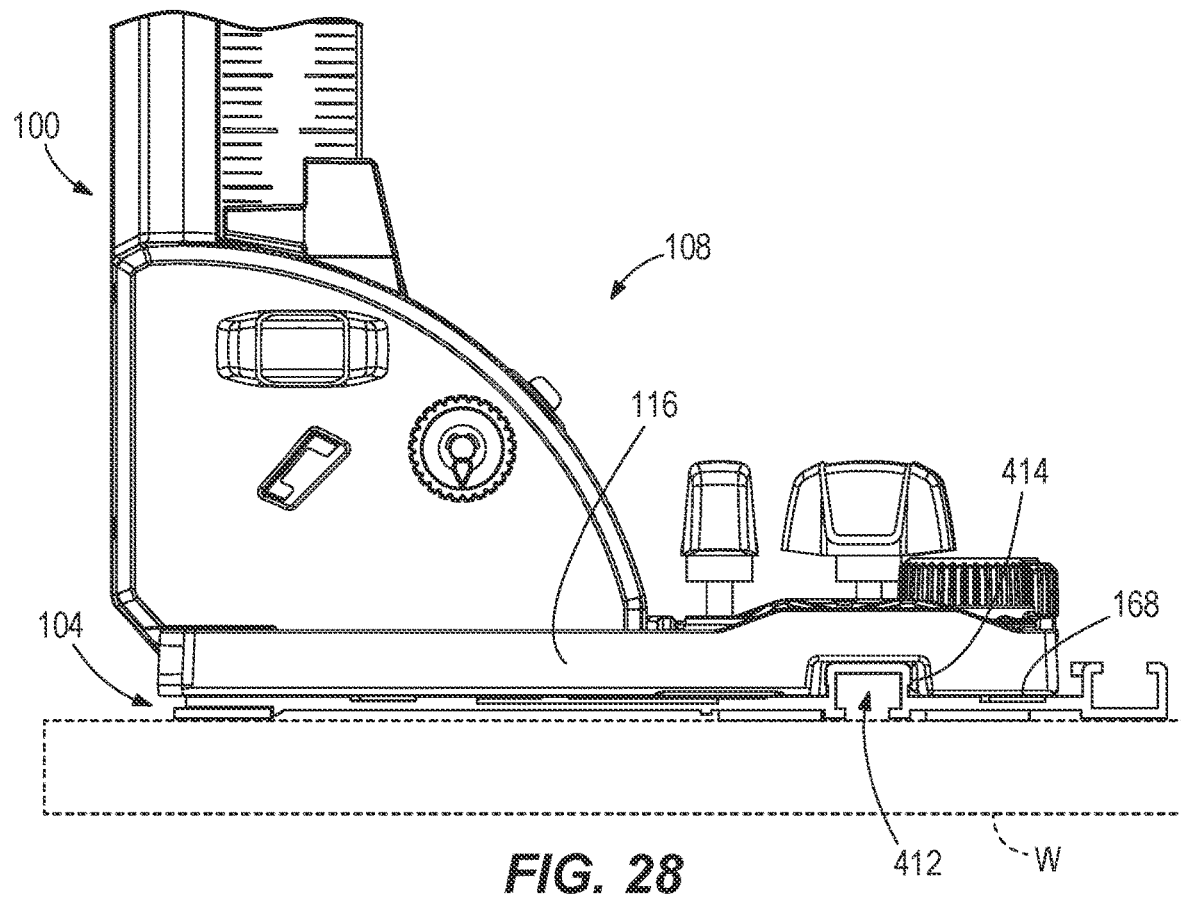
FIG. 28 is an end view of the track saw assembly of FIG. 1.

With continued reference to FIG. 27 and reference to FIG. 28, the track 104 includes a first rail 412 extending parallel with the axis 112 and upward from the tool side 396. The first rail 412 is received within a corresponding longitudinal groove 414 within the lower surface 168 of the shoe 116, thus restricting movement of the track saw 100 relative to the track 104 to a single degree of freedom (e.g., translation or sliding). The first rail 412 has an upper surface 416 and an opening 420 opposite the upper surface 416, which exposes the interior of the first rail 412 to the workpiece side 392. As explained in further detail below, the interior of the first rail 412 defines a clamp slot 424.

Figure 29:
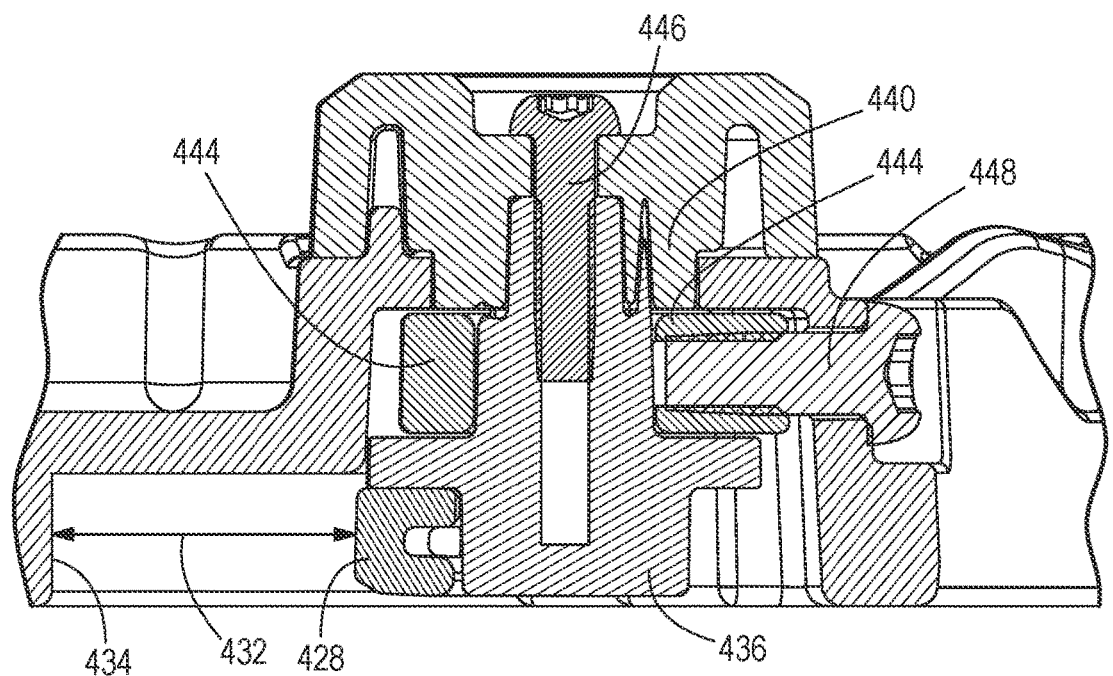
FIG. 29 is a section view of a track slide taken along section 29-29 in FIG. 6.

FIGS. 7 and 29 illustrate an adjustable track slide 428 located on the underside of the shoe 116 and operable to adjust an interface between the shoe 116 and the first rail 412. With reference to FIG. 7, the track slide 428 is positioned adjacent the longitudinal groove and is movable in a direction perpendicular to the longitudinal axis 112 to increase or decrease the width of a clearance 432 (FIG. 29) between the track slide 428 and an opposing pad 434 of the shoe 116. As shown in FIG. 29, the track slide 428 is moved in response to rotation of a cam 436 and a knob 440 coupled for co-rotation with the cam 436. The knob 440 extends above the shoe 116 and is fitted with a friction ring 444. A fastener 446 connects the knob 440 to the cam 436. A friction screw 448 is tightened to pull the friction ring 444 against the cam 436 to allow fine adjustment of torque (i.e., input force) required to turn the knob 440. A user can also lock the cam 436 by applying a high torque to the screw 448. Other track slides 428 adjusting the width of the clearance 432, and thus, the friction between the shoe 116 and the track 104 are possible. For example, a track slide 428 may include multiple faces (not shown) for engaging the shoe 116. In another example, the track slide 428 may include a detenting piece 428a (FIG. 7) that can interact with the cam 436 to permit small, discrete adjustment steps between the extreme inward and outward positions of the slide 428. In some embodiments, the detenting piece 428a is wedged into the side of the shoe 116. The cam 436 may hold the detenting piece 428a in place.

With reference to FIG. 27, the track 104 includes a second rail 452 having an opening 456 defined between opposed flanges 458 and facing the tool side 396. The second rail 452 also has a lower surface 460 adjacent the workpiece side 392. The second rail 452 is operable to support a device (e.g., FIG. 36-37) on the track 104 for translation along or securement at a position along the longitudinal axis 112. The device may be a secondary or auxiliary device for guiding or otherwise interacting with the track saw 100 or the workpiece W. The second rail 452 is adjacent the second side 404 of the track 104.

Figure 30:
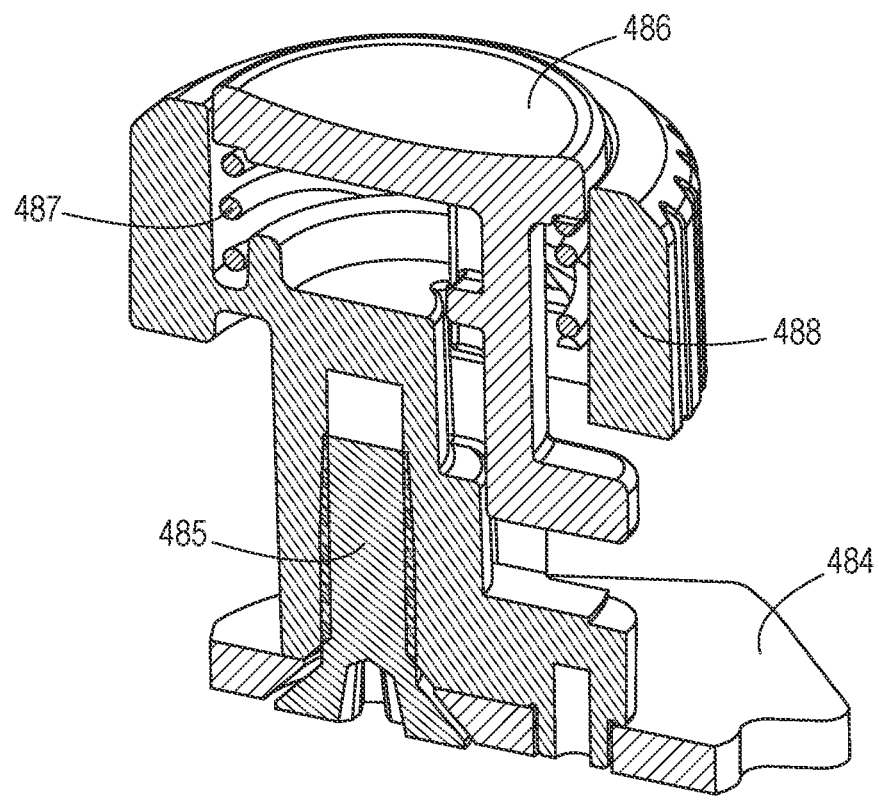
FIG. 30 is a section view of an anti-tip finger taken along section line 30-30 in FIG. 2 with other portions of the track saw hidden.
Figure 31:
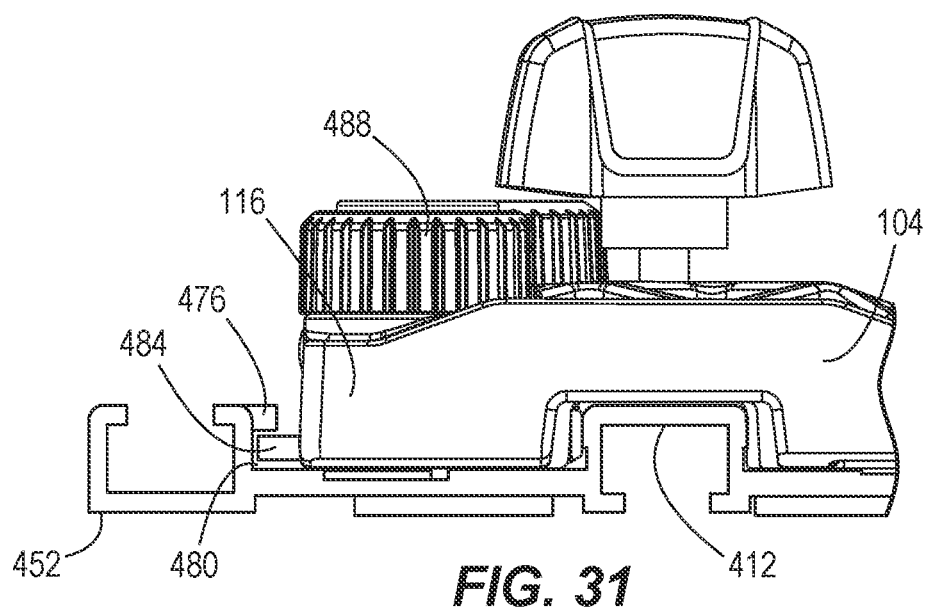
FIG. 31 is an end view of the anti-tip finger of FIG. 30 in an engaged position.

With continued reference to FIG. 27 and further reference to FIGS. 30 and 31, the track 104 further includes an overhanging lip 476 extending laterally from the second rail 452 and forming a lip slot 480. With reference to FIGS. 30 and 31, the track saw 100 may include a finger 484, which is movable into and out of the lip slot 480, to prevent lifting the track saw 100 from the track 104. A knob 488 is rotated to rotate the finger 484 between an engaged position (FIG. 31 and illustrated in dashed lines in FIG. 7), in which the finger 484 horizontally overlaps the overhanging lip 476, and a disengaged position (illustrated in solid lines in FIG. 7), in which the finger 484 is horizontally misaligned with (i.e., retracted from) the overhanging lip 476. The finger 484 is attached to the knob 488 by a fastener 485. A button 486 attached to the finger 484 can move between a locked position in which the finger 484 is not movable and an unlocked position in which the finger 484 is movable. The button 486 is biased by a spring 487 towards the locked position.

Figure 33:
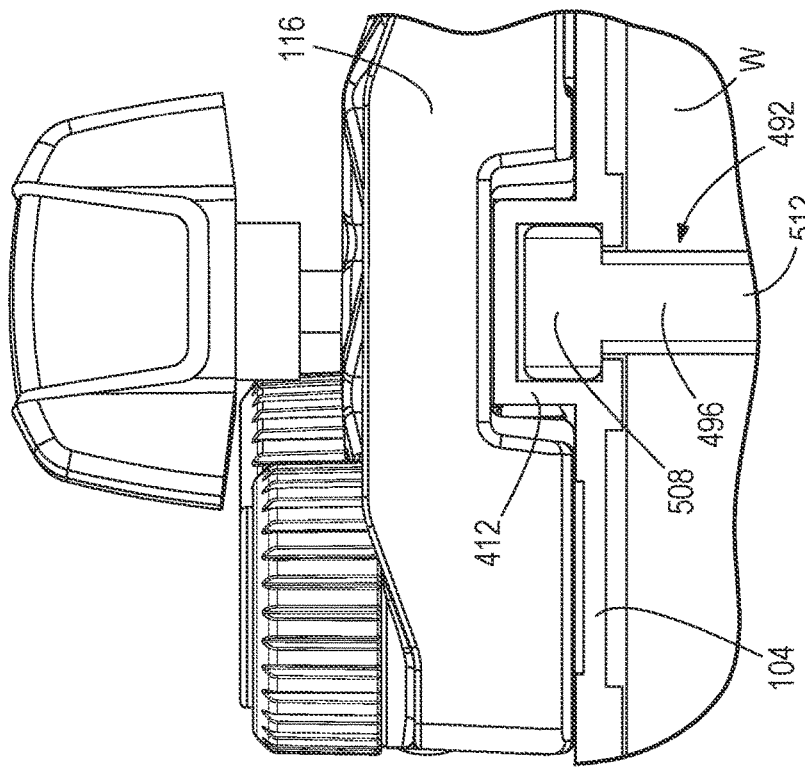
FIG. 33 is an end view of the track clamp of FIG. 32.
Figure 32:
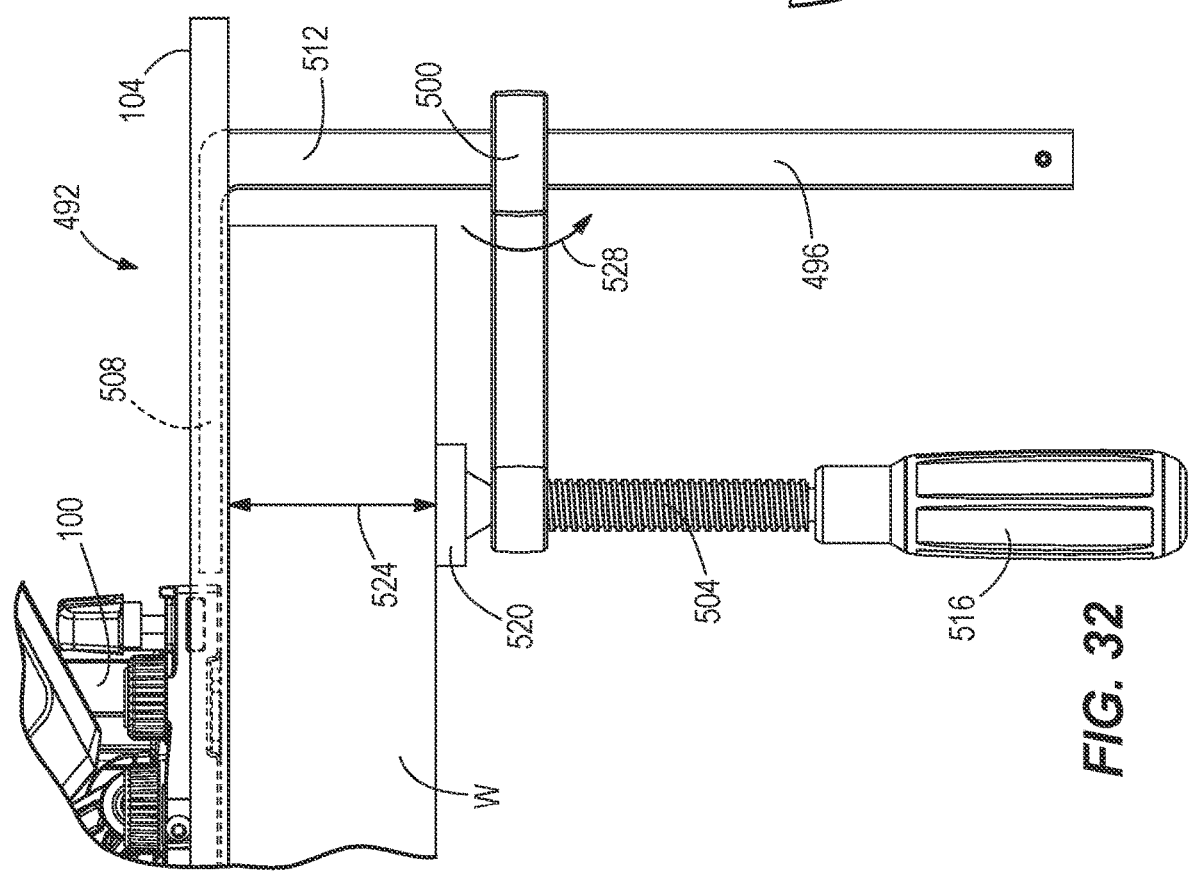
FIG. 32 is a side view of a track clamp for use with the track saw assembly of FIG. 1.

With reference to FIGS. 32 and 33, the track saw assembly 108 may further include a track clamp 492 that prevents the track 104 from separating from the work piece W. As shown in FIG. 32, the track clamp 492 includes an L-bar 496 that engages the track 104 and a crossbar 500 extending between the L-bar 496 and a threaded rod 504. The L-bar 496 engages the first rail 412 of the track 104 within the clamp slot 424 (as illustrated in FIG. 33). The threaded rod 504 is adjustable with the crossbar 500 to engage various widths of work pieces W. The L-bar 496 includes a first (e.g., horizontal) portion 508 that slidably engages the first rail 412. The L-bar 496 further includes a second (e.g., vertical) portion 512 that extends generally perpendicularly from the first portion 508. The second portion 512 engages the crossbar 500, which extends generally parallel with the first portion 508. The threaded rod 504 may include a trapezoidal thread for locking the track clamp 492. Other types of threads may connect the threaded rod 504 to the track clamp 492. The threaded rod 504 is insert molded into a handle 516 at one end. At the other end of the threaded rod 504, a foot 520 is operable to provide a clamping force against the workpiece W. The crossbar 500 can be slid up and down on the L-bar 496 for a quick macro-adjustment of the clamping width. The clamping force applied to the work piece W, and the resulting reaction force against the foot 520, shown by the double arrow 524 create a moment 528, wedging the crossbar 500 against the L-bar 496. This prevents the crossbar 500 and the L-bar 496 from slipping relative to each other during clamping. The second portion 512 extends away from the first portion 508 beyond the bounds of the workpiece W.

Figure 36:
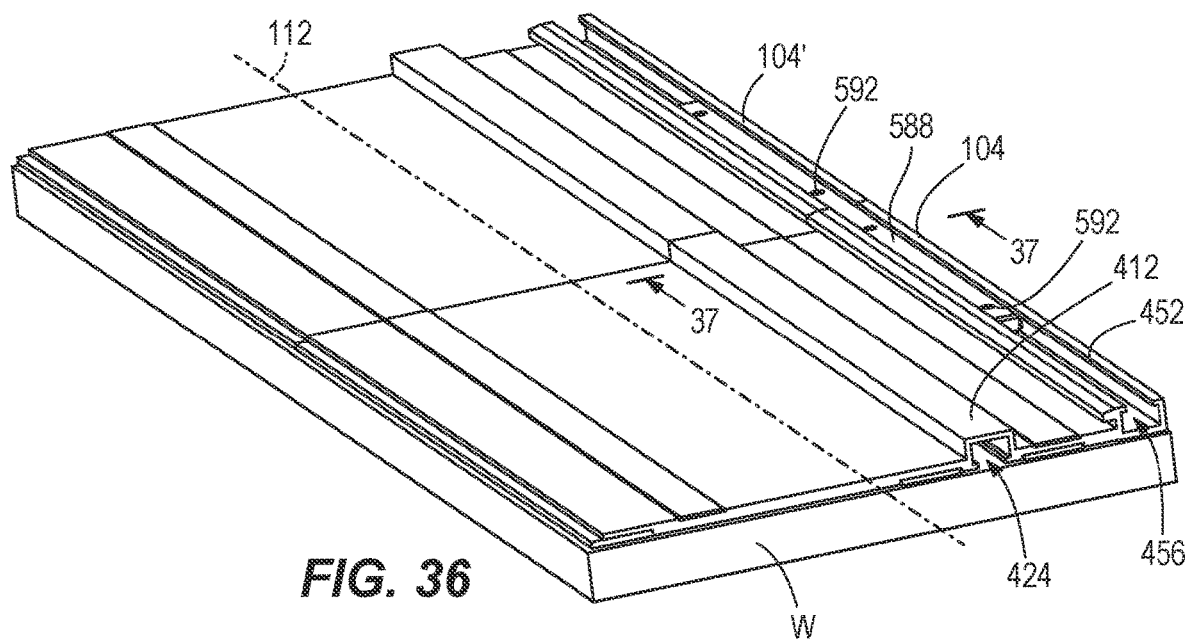
FIG. 36 is a perspective view of a track, another track, and a track connector.
Figure 37:
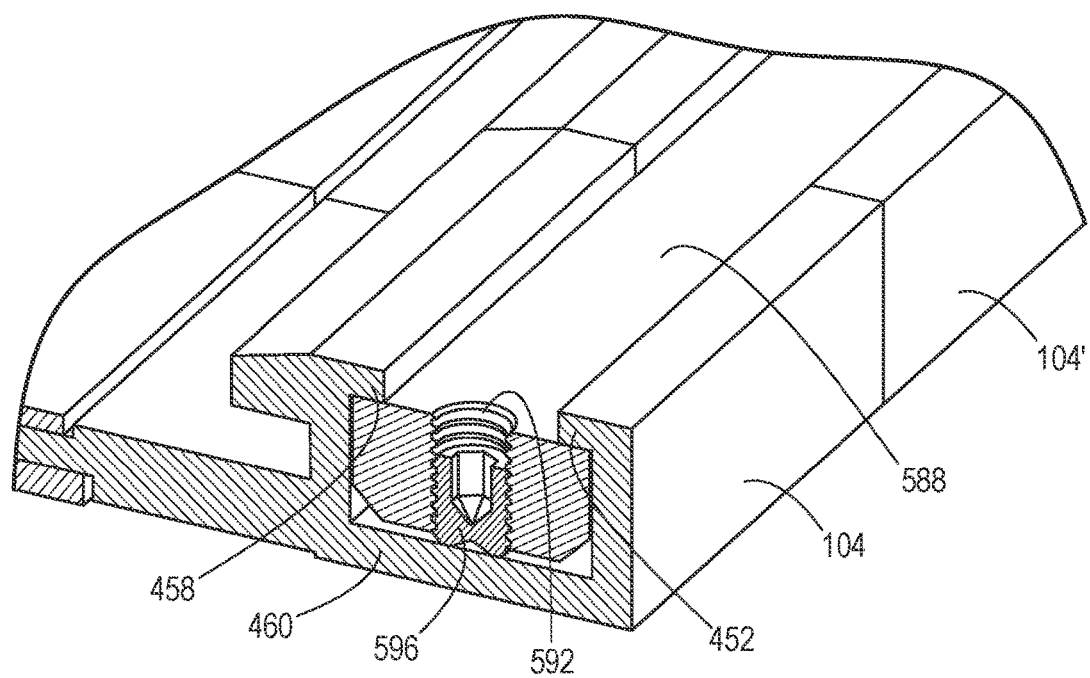
FIG. 37 is a sectional view of the track connector of FIG. 36 taken along section 37-37 in FIG. 36.

With reference to FIGS. 36 and 37, the track 104 may be connected to another track 104' by a track connector 588. The track 104' may be of similar construction to the track 104. The track connector 588 includes threaded bores 592 in which setscrews 596 are received. The setscrews 596 may be hex head set screws optionally having tips of a different material than the remainder of the setscrew 596. For example, the setscrews 596 may have nylon tips. The track connector 588 may be made of steel. The track connector 588 may be hardened and/or coated for wear resistance. In the manufacturing of the track connector 588, relatively tight manufacturing tolerances (e.g., at least ±0.01") are required in forming the width of the track connector 588 to ensure alignment along the longitudinal axis 122 of the track 104 and the other track 104'.

With continued reference to FIGS. 36 and 37, to interconnect two separate tracks 104, 104', the track 104 is aligned with the track 104' along the longitudinal axis 112. The connector 588 is then pushed through the opening 456 of the second rail 452 to a position along the longitudinal axis 122 bridging both tracks 104, 104'. In the illustrated embodiment, the track connector 588 is positioned along the longitudinal axis 122 with at least one bore 592 and at least one setscrew 596 extending perpendicularly from each of the track 104 and the track 104'. In another embodiment, the connector 588 is pushed through the clamp slot 424 of the first rail 412 to a position along the longitudinal axis 122 bridging both tracks 104, 104'. Optionally, track connectors 588 are received in both the clamp slot 424 and the opening 456. The setscrews 596 are then tightened to apply a clamping force between the connector 588 and the flanges on the second rail 452, which creates friction between the connector 588 and the tracks 104, 104' that resists separation of the tracks 104, 104'.

Figure 34:
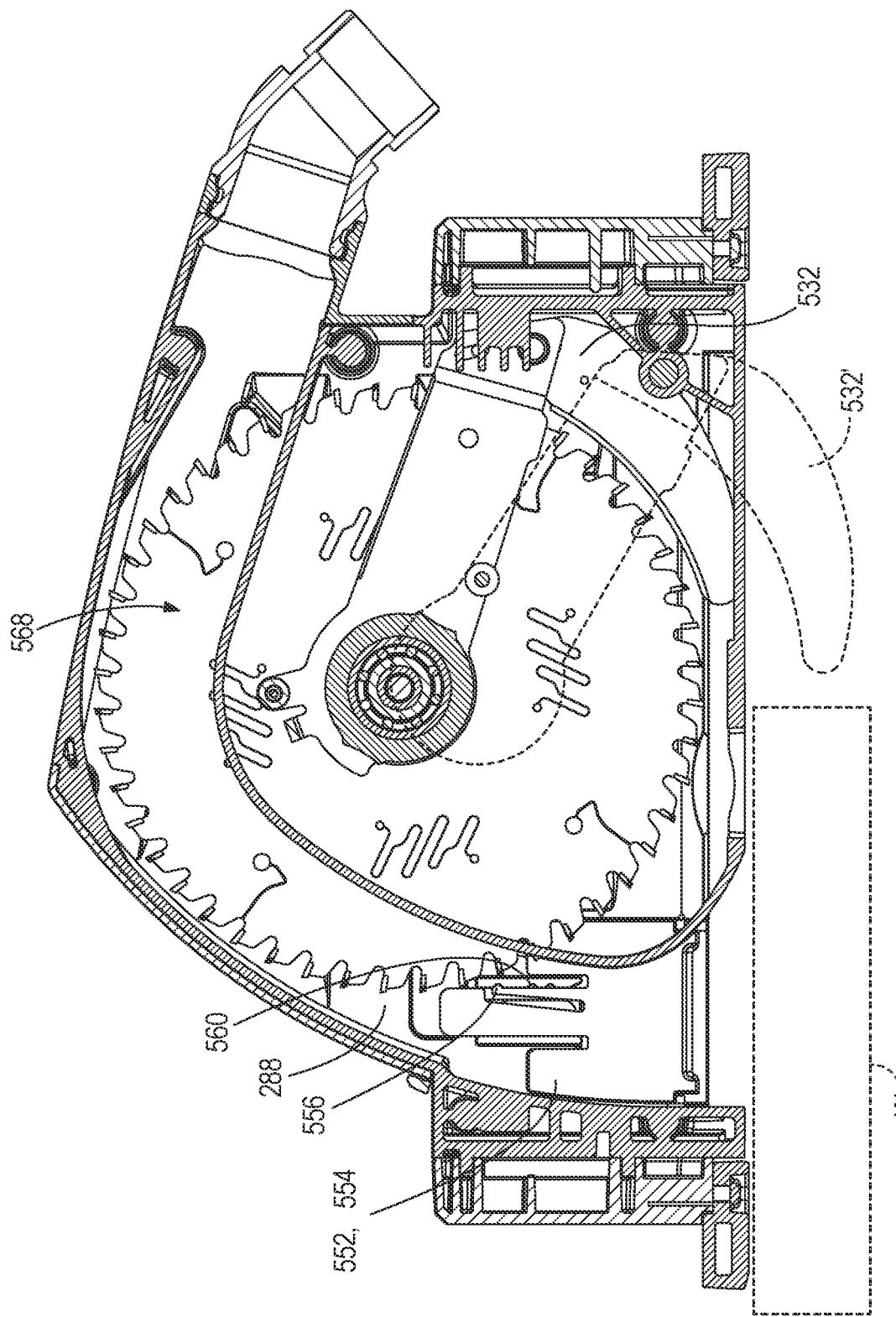
FIG. 34 is a section view of the track saw taken along section 34-34 in FIG. 4.
Figure 35:
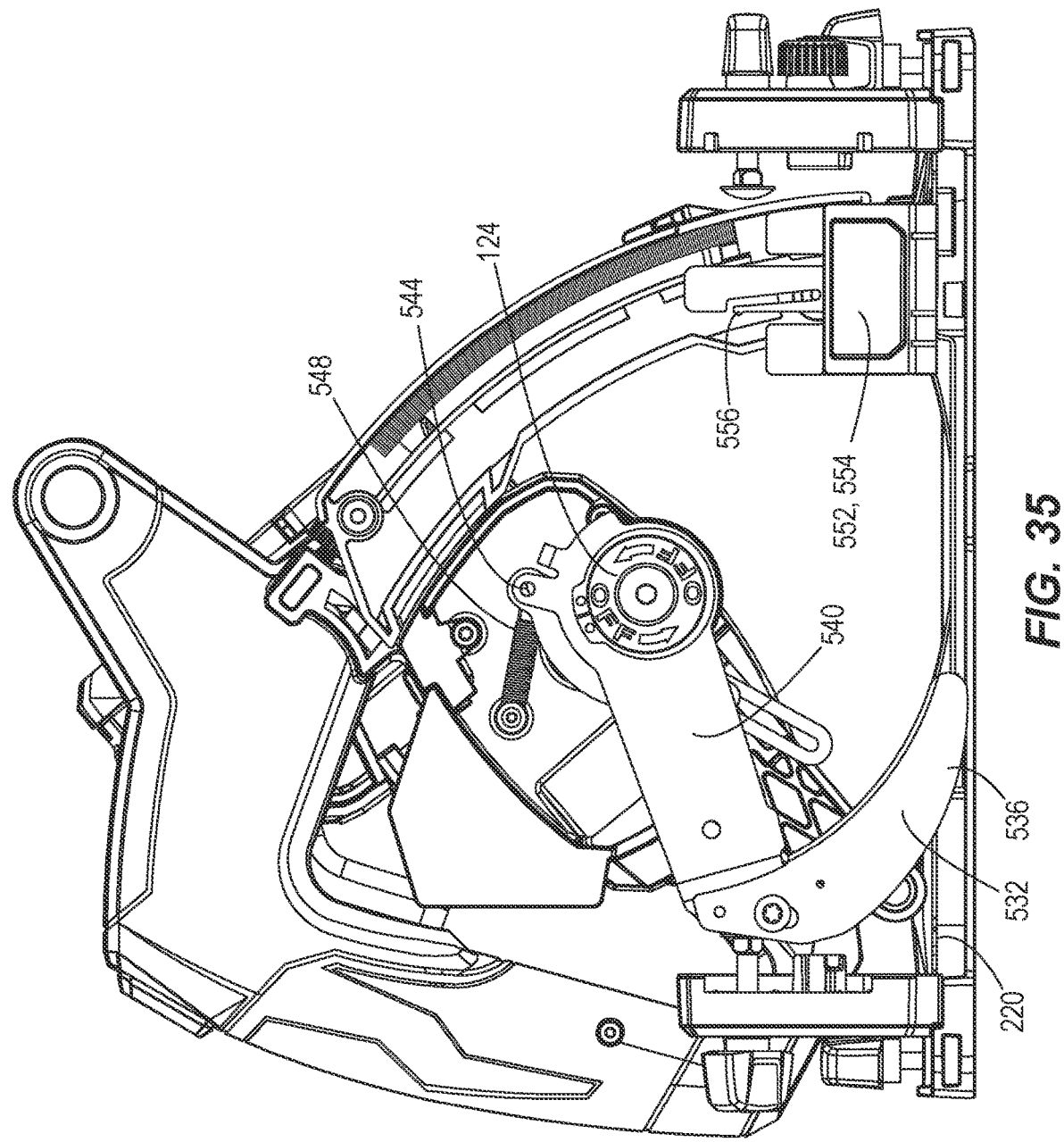
FIG. 35 is another second side view of the track saw of FIG. 1 with some portions of the track saw hidden.

With reference to FIG. 34, the track saw 100 further includes a riving knife 532 configured to project below the shoe 116 and follow the blade 128 within a cut of the work piece W. With reference to FIG. 35, the riving knife 532 includes a knife arm 536, a lever arm 540, and a notch 544. The lever arm 540 is connected to the knife arm 536 at one end and the saw unit 124 at the other end. The notch 544 is generally in the same plane, but on the opposite side of the saw unit 124 as the lever arm 540. A tension spring 548 is fixed between the notch 544 and the saw unit 124 to bias the knife arm 536 towards the plunged position within the cut of the work piece W. After a cut is made in the work piece and the track saw 100 is translated along the longitudinal axis 112, the riving knife 532 will enter the cut within the work piece W as the compression spring 548 relaxes. If the riving knife 532 comes into contact with solid material, the knife arm 536 will experience an upward force, causing the riving knife 532 to pivot against the bias of the spring 548.

FIGS. 34-35 also illustrate a blade window 552 and/or a splinter guard 554 of the track saw 100. The track saw 100 may be configured to engage one of the blade window 552 and the splinter guard 554 in the same location upon the track saw 100. Two fastening mechanisms may secure one of the blade window 552 or the splinter guard 554 to the track saw 100 at a time. The splinter guard 554 prevents blowout or splintering of the workpiece W during a cut. With reference to FIG. 34, the splinter guard 554 but generally located behind the blade window 552) can be used to press against the workpiece W (in a direction parallel to the vertical reference plane 144 in FIGS. 1 and 9) causing the surface of the workpiece W to retain its shape and not form splinters. The splinter guard 554 is opaque and is fastened to the upper blade guard 288. In the illustrated embodiment of FIG. 3, the splinter guard 554 includes a knob 554a. The knob extends through a slot 553 (FIG. 3) in the upper blade guard 288 and is tightened to secure the splinter guard 554 against the upper blade guard 288. Tightening the knob 554a with the nut on the opposite side of the upper blade guard 288 locks the splinter guard in place. The splinter guard may be otherwise connected or adjustably connected to the upper blade guard 288.

Referring back to FIG. 27, to ensure the cutting piece is free from splinters, the splinter guard 554 directly abuts the saw blade 128 in a lateral direction perpendicular to the longitudinal axis 112 of the track 104. When the user first operates the saw 100 using the splinter guard 554, the saw blade 128 cuts through the splinter guard 554, creating zero clearance between the saw blade 128 and the splinter guard 554. In the illustrated embodiment, the zero clearance between the saw blade 128 and the splinter guard 554 is a nominal zero clearance. In other words, the splinter guard 554 is desired and ideally at zero clearance with the saw blade 128. Some variation due to, for example, manufacturing tolerances of the splinter guard 554 and/or the saw blade 128, changing of environmental conditions, and forces applied to the splinter guard 554 and/or the saw blade 128 may deviate the splinter guard 554 the nominal zero clearance with the saw blade 128.

Alternatively, FIGS. 34-35 depict the blade window 552 in the same general location as the proposed splinter guard 554. The blade window 552 is transparent to permit a user to see through the blade window 552 to the blade 128. As illustrated in FIGS. 34-35, the blade window 552 includes a pawl 556 which engages at least one detent 560 within the upper blade guard 288. The upper blade guard 288 has a plurality of detents 560 to allow a user to adjust the depth of the blade window 552 relative to the upper blade guard 288 depending on the use of the track saw 100 (e.g., when used with or without the track). The blade window 552 is adjustable to engage the detents by applying a downward or upward pressure on the blade window 552. A user may directly apply the downward or upward pressure on the blade window 552, as the blade window 552 is on the exterior of the track saw 100, as viewed in at least FIG. 3. Subsequently, (returning to FIG. 34) the pawl 556 will engage or disengage the detent 560. The blade window 552 may be otherwise connected or adjustably connected to the upper blade guard 288. For example, the blade window 552 may be secured to the upper blade guard 288 by the tightening knob 554a as described with regard to the splinter guard 554. Alternatively, the splinter guard 554 may be secured to the upper blade guard by a pawl 556 and detent 560 as described with regard to the blade window 552.

Various features of the invention are set forth in the following claims.

What is claimed is:

1. A circular saw comprising:
   a shoe including an upper surface and an opposite, lower surface;
   a saw unit including a circular saw blade, a depth scale including a channel, and a blade change cam coupled to a lever, the saw unit pivotably coupled to the shoe between a first position in which the saw blade does not protrude beyond the lower surface of the shoe, and a second position in which the saw blade protrudes beyond the lower surface of the shoe;

a trigger which controls operation of the saw unit; and a plunge lockout mechanism coupled to the saw unit for movement therewith between the first position and the second position, the plunge lockout mechanism including:

an actuator linearly translatable between a released position and a depressed position, a trigger lockout movable in response to movement of the actuator between a trigger lockout position and a retracted position, and a latch engaged by the actuator in response to linear translating movement of the actuator, the latch rotatable about a pivot between a locked position and an unlocked position;

wherein in the released position of the actuator,
the latch is in the locked position to prevent movement of the saw unit from the first position to the second position, and
the trigger lockout is in the trigger lockout position to prevent engagement of the trigger, and wherein in the depressed position of the actuator,
the latch is in the unlocked position to allow movement of the saw unit from the first position to the second position, and
the trigger lockout is in the retracted position to allow the engagement of the trigger;

wherein the channel is configured to receive the latch when in the unlocked position to permit movement of the saw unit from the first position to the second position; and wherein the lever is operable to move the blade change cam between a blade change position in which the blade change cam prohibits translation of the actuator, and an operation position in which the saw unit can be moved from the first position to the second position.

2. The circular saw of claim 1, wherein the actuator is biased toward the released position by a spring.

3. The circular saw of claim 1, wherein the saw unit further comprises an electric motor configured to provide torque to the saw blade, causing it to rotate,
wherein the trigger is configured to selectively activate the electric motor, and
wherein the trigger lockout is a trigger lockout plate formed as a distinct component separate from the actuator, the trigger lockout plate being movable between the trigger lockout position and the retracted position.

4. The circular saw of claim 3, wherein the trigger lockout plate is biased toward the trigger lockout position by a spring.

5. The circular saw of claim 1, wherein the channel includes a ramped entrance.

6. The circular saw of claim 1, wherein the channel includes a blade change notch configured to receive the latch to lock the saw unit relative to the shoe to facilitate exchange of the saw blade.

7. The circular saw of claim 6, wherein in the blade change position, the blade change cam is configured to prevent translation of the actuator and subsequent movement of the latch from the locked position to the unlocked position.

8. The circular saw of claim 6, further comprising a spring configured to bias the latch against the channel in response to the blade change cam being moved to the blade change position, wherein the spring is configured to pivot the latch from the unlocked position and into the blade change notch during movement of the saw unit from the first position toward the second position, thereby holding the saw unit in an intermediate position between the first position and the second position to facilitate exchange of the saw blade.

9. The circular saw of claim 1, wherein the translating movement of the actuator between the released position and the depressed position is restricted to linear translation along a single degree of freedom.

10. A circular saw comprising:
a shoe including an upper surface and an opposite, lower surface;

a saw unit including a circular saw blade and a blade change cam coupled to a lever, the saw unit pivotably coupled to the shoe between a first position in which the saw blade does not protrude beyond the lower surface of the shoe, and a second position in which the saw blade protrudes beyond the lower surface of the shoe;

a trigger which controls operation of the saw unit; and a plunge lockout mechanism coupled to the saw unit for movement therewith between the first position and the second position, the plunge lockout mechanism including:

an actuator movable between a released position and a depressed position, a trigger lockout movable in response to movement of the actuator between a trigger lockout position and a retracted position, and a latch engaged by the actuator in response to movement of the actuator, the latch movable between a locked position and an unlocked position;

wherein in the released position of the actuator,
the latch is in the locked position to prevent movement of the saw unit from the first position to the second position, and
the trigger lockout is in the trigger lockout position to prevent engagement of the trigger, and wherein in the depressed position of the actuator,
the latch is in the unlocked position to allow movement of the saw unit from the first position to the second position, and
the trigger lockout is in the retracted position to allow the engagement of the trigger;

wherein the lever is operable to move the blade change cam between a blade change position in which the blade change cam prohibits movement of the actuator, and an operation position in which the saw unit can be moved from the first position to the second position.

11. The circular saw of claim 10, wherein the actuator is biased toward the released position by a spring.

12. The circular saw of claim 10, wherein the saw unit further comprises an electric motor configured to provide torque to the saw blade, causing it to rotate,
wherein the trigger is configured to selectively activate the electric motor, and wherein the trigger lockout is a trigger lockout plate formed as a distinct component separate from the actuator, the trigger lockout plate being movable between the trigger lockout position and the retracted position.

13. The circular saw of claim 12, wherein the trigger lockout plate is biased toward the trigger lockout position by a spring.

14. The circular saw of claim 10, wherein the saw unit further comprises a depth scale including a channel configured to receive the latch when in the unlocked position to permit movement of the saw unit from the first position to the second position.

15. The circular saw of claim 14, wherein the channel includes a ramped entrance.

16. The circular saw of claim 14, wherein the channel includes a blade change notch configured to receive the latch to lock the saw unit relative to the shoe to facilitate exchange of the saw blade.

17. The circular saw of claim 16, wherein in the blade change position, the blade change cam is configured to prevent movement of the actuator and subsequent movement of the latch from the locked position to the unlocked position.

18. The circular saw of claim 16, further comprising a spring configured to bias the latch against the channel in response to the blade change cam being moved to the blade change position, wherein the spring is configured to pivot the latch from the unlocked position and into the blade change notch during movement of the saw unit from the first position toward the second position, thereby holding the saw unit in an intermediate position between the first position and the second position to facilitate exchange of the saw blade.

* * * * *